United States Patent
Ando et al.

(10) Patent No.: US 10,040,958 B2
(45) Date of Patent: Aug. 7, 2018

(54) COLORED RESIN PARTICLE DISPERSION AND INKJET INK

(71) Applicant: RISO KAGAKU CORPORATION, Tokyo (JP)

(72) Inventors: Kazuyuki Ando, Ibaraki (JP); Yoshifumi Watanabe, Ibaraki (JP); Manami Shimizu, Ibaraki (JP)

(73) Assignee: RISO KAGAKU CORPORATION, Tokyo (JP)

( * ) Notice: Subject to any disclaimer, the term of this patent is extended or adjusted under 35 U.S.C. 154(b) by 181 days.

(21) Appl. No.: 14/597,942

(22) Filed: Jan. 15, 2015

(65) Prior Publication Data

US 2015/0197652 A1 Jul. 16, 2015

(30) Foreign Application Priority Data

Jan. 16, 2014 (JP) .................................. 2014-005753

(51) Int. Cl.
| | | |
|---|---|---|
| C08K 3/04 | (2006.01) | |
| C09B 67/08 | (2006.01) | |
| C09B 67/20 | (2006.01) | |
| C09B 67/46 | (2006.01) | |
| C09D 11/023 | (2014.01) | |
| C09D 11/32 | (2014.01) | |
| C09D 11/36 | (2014.01) | |
| C09D 101/18 | (2006.01) | |
| C09D 129/04 | (2006.01) | |
| C09D 131/04 | (2006.01) | |
| C09D 133/00 | (2006.01) | |
| C09D 177/00 | (2006.01) | |

(52) U.S. Cl.
CPC ................ *C09D 11/36* (2013.01); *C08K 3/04* (2013.01); *C09B 67/009* (2013.01); *C09B 67/0013* (2013.01); *C09B 67/0061* (2013.01); *C09B 67/0069* (2013.01); *C09D 11/023* (2013.01); *C09D 11/32* (2013.01); *C09D 101/18* (2013.01); *C09D 129/04* (2013.01); *C09D 131/04* (2013.01); *C09D 133/00* (2013.01); *C09D 177/00* (2013.01)

(58) Field of Classification Search
CPC .... C09D 11/36; C09D 101/18; C09D 133/00; C09D 177/00; C09D 131/04; C09D 129/04; C09D 11/32; C09D 11/023; C08K 3/04; C09B 67/0013; C09B 67/0069; C09B 67/009; C09B 67/0061
See application file for complete search history.

(56) References Cited

U.S. PATENT DOCUMENTS

| | | | |
|---|---|---|---|
| 3,383,352 A | 5/1968 | Duell et al. | |
| 4,680,058 A | 7/1987 | Shimizu et al. | |
| 4,762,568 A | 8/1988 | Nakamura et al. | |
| 5,447,561 A | 9/1995 | Chiba et al. | |
| 6,395,805 B1 | 5/2002 | Takao | |
| 6,916,365 B1 * | 7/2005 | Casper ............... | C08G 18/6254 106/238 |
| 8,329,761 B2 | 12/2012 | Nair et al. | |
| 2004/0006158 A1 | 1/2004 | Horie et al. | |
| 2004/0147633 A1 | 7/2004 | Kamikubo et al. | |
| 2004/0195711 A1 | 10/2004 | Hayashi et al. | |
| 2007/0189998 A1 | 8/2007 | Nair et al. | |
| 2009/0238606 A1 | 9/2009 | Ueno et al. | |
| 2011/0009537 A1 | 1/2011 | Kotera et al. | |
| 2011/0046298 A1 | 2/2011 | Hosoya et al. | |
| 2011/0305880 A1 | 12/2011 | Nakamura et al. | |
| 2012/0141747 A1 | 6/2012 | Deeter et al. | |
| 2012/0266779 A1 | 10/2012 | Morinaga et al. | |
| 2012/0289673 A1 | 11/2012 | Tsai et al. | |
| 2013/0197144 A1 | 8/2013 | Katoh et al. | |
| 2015/0197648 A1 | 7/2015 | Watanabe et al. | |
| 2015/0197666 A1 | 7/2015 | Shimizu et al. | |

FOREIGN PATENT DOCUMENTS

| | | |
|---|---|---|
| CN | 1435699 | 8/2003 |
| CN | 1517414 | 1/2004 |
| CN | 101273098 | 9/2008 |
| CN | 101539730 | 9/2009 |
| CN | 101760042 | 6/2010 |
| CN | 102015924 | 4/2011 |
| CN | 102137891 | 7/2011 |
| JP | 62-500597 | 3/1987 |
| JP | 8-234502 A | 9/1996 |

(Continued)

OTHER PUBLICATIONS

Search Report dated Jun. 8, 2015 in corresponding European patent application No. 15151104.5, 6 pages total.
Search Report dated Jun. 5, 2015 in corresponding European patent application No. 15151108.6, 5 pages total.
Search Report dated May 29, 2015 in corresponding European patent application No. 15151103.7, 5 pages total.
Search Report dated Jun. 12, 2015 in corresponding European patent application No. 15151105.2, 4 pages total.
U.S. Appl. No. 14/596,732, filed Jan. 14, 2015.

(Continued)

*Primary Examiner* — Patrick Dennis Niland
(74) *Attorney, Agent, or Firm* — Hamre, Schumann, Mueller & Larson, P.C.

(57) ABSTRACT

A colored resin particle dispersion and an ink are provided which yield excellent abrasion resistance for printed items. Moreover, a colored resin particle dispersion and an inkjet ink are provided which exhibit excellent abrasion resistance, water resistance and marker resistance, as well as favorable storage stability. Specifically provided are a colored resin particle dispersion containing colored resin particles, a basic dispersant, and a non-aqueous solvent, wherein the colored resin particles include a colorant and a crosslinked solid resin, and an inkjet ink containing this colored resin particle dispersion.

15 Claims, No Drawings

(56) References Cited

FOREIGN PATENT DOCUMENTS

| JP | 2001-031900 | | 2/2001 |
|---|---|---|---|
| JP | 2002-047440 | | 2/2002 |
| JP | 2004-018736 | | 1/2004 |
| JP | 2005-126587 | | 5/2005 |
| JP | 2005-255911 | | 9/2005 |
| JP | 2006-008849 | | 1/2006 |
| JP | 2006-008850 | | 1/2006 |
| JP | 2006-193648 | | 7/2006 |
| JP | 2006-232990 | | 9/2006 |
| JP | 2007-197632 | | 8/2007 |
| JP | 2007-197633 | | 8/2007 |
| JP | 2007-231106 | A | 9/2007 |
| JP | 2007-231107 | A | 9/2007 |
| JP | 2009-126995 | | 6/2009 |
| JP | 2009-128741 | | 6/2009 |
| JP | 2009-242649 | A | 10/2009 |
| JP | 2009-249598 | | 10/2009 |
| JP | 2010-033000 | | 2/2010 |
| JP | 2010-270225 | A | 12/2010 |
| JP | 2011-095643 | | 5/2011 |
| JP | 2012-11740 | | 1/2012 |
| JP | 2012-107229 | A | 6/2012 |
| JP | 2012-224781 | A | 11/2012 |
| JP | 2012-533650 | A | 12/2012 |
| JP | 2014-19770 | A | 2/2014 |
| JP | 2015-134852 | | 7/2015 |
| JP | 6077772 | B | 2/2017 |
| WO | 2004/003091 | | 1/2004 |
| WO | 2011/144671 | | 11/2011 |
| WO | 2013/005019 | | 1/2013 |

OTHER PUBLICATIONS

U.S. Appl. No. 14/597,909, filed Jan. 15, 2015.
U.S. Appl. No. 14/599,012, filed Jan. 16, 2015.
U.S. Appl. No. 14/598,947, filed Jan. 16, 2015.
Chinese Official Action, dated Jun. 28, 2016, Chinese Patent Application No. 201510020731.7 (7 pages).
Chinese Official Action, dated Jul. 1, 2016, Chinese Patent Application No. 201510020695.4 (7 pages).
Chinese Official Action, dated Jun. 29, 2016, Chinese Patent Application No. 201510020653.0 (6 pages).
Chinese Official Action, dated Jun. 28, 2016, Chinese Patent Application No. 201510020767.5 (6 pages).
Chinese Official Action, dated Jun. 28, 2016, Chinese Patent Application No. 201510020738.9 (6 pages).
Non-final Office Action dated Sep. 28, 2016 for U.S. Appl. No. 14/597,909, filed Jan. 15, 2015 (32 pages).
Definition of dye. Collins English Dictionary. http://www.collinsdictionary.com/dictionary/english/dye. As viewed on Mar. 17, 2016. (3 pages).
Definition of colorant. Hawley's Condensed Chemical Dictionary. John Wiley & Sons, Inc. 2007. (2 pages).
Guernelli, S.; Lagana, M.F.; Mezzina, E.; Ferroni, F.; Siani, G.; Spinelli, D. "Supramolecular complex formation: A study of the interactions between b-cyclodextrin and some different classes of organic compounds by ESI-MS, surface tension measurements, and UV/Vis and 1H NMR spectroscopy". European Journal of Chemistry, 2003, pp. 4765-4776.
Machine Translation of JP2009-249598A. Oct. 29, 2009 (8 pages).
Auschra, C.; Eckstein, E.; Knishka, R.; Pinang, F.; Harbers, P. "Controlled polymers for pigment dispersants". European Coatings Journal. 2004. Issue 6. (9 pages).
Non-final Office Action dated Mar. 30, 2016, for U.S. Appl. No. 14/596,732, filed Jan. 14, 2015. (47 pages).
Search Report dated Jun. 10, 2015 in corresponding European patent application No. 15151106.0, 4 pages total.
Sunohara et al., "Preparation of polyvinylpyrrolidone fine particles by inverse emulsification-evaporation process in solvent," Kobunshi Ronbunshu, 2005, vol. 62, No. 7, pp. 310-315 (English language abstract provided).
Official Action for Japanese Patent Application No. 2014-005731, dated Feb. 21, 2017 (3 pages).
Japanese Official Action, Japanese Patent Application No. 2014-005726, dated Feb. 28, 2017 (3 pages).
Official Action, Japanese Patent Application No. 2014-005732; dated Apr. 25, 2017, (2 pages).
Non-final Office Action dated Nov. 25, 2016 for U.S. Appl. No. 14/598,947, filed Jan. 16, 2015 (30 pages).
Final Office Action dated Nov. 10, 2016 for U.S. Appl. No. 14/596,732, filed Jan. 15, 2015 (40 pages).
Meislich, H. "Schaum's Outline of Theory and Problems of Organic Chemistry", 3rd Ed. New York: McGraw-Hill Professional, 1999, 3rd ed. (Schaum's Outline Series), ISBN: 9780071341653, pp. 42-45.
"Walsroder solubility", Dow Answer Center, http://dowac.custhelp.com/app/answers/detail/a_id/8344/~/walsroder-solubility, As viewed on Oct. 21, 2016.
"Ricca Chemical Company Oxidation-Reduction Potential (ORP)", Jul. 12, 2005 (1 page), Available online at: URL: http://www.riccachemical.com/Documents/TRD19.pdf.
Official Action, European Patent Application No. 15151104.5, dated Aug. 7, 2017 (4 pages).
Disperbyk 106 material data safety shee. Byk additives and instruments. Jun. 1, 2016 (10 pages).
U.S. Office Action. U.S. Appl. No. 14/596,732, dated Jun. 6, 2017 (43 pages).
Official Action, Japanese Patent Application No. 2014-005729, dated May 16, 2017 (2 pages).
Official Action, Japanese Patent Application No. 2014-005753, dated Jul. 4, 2017 (3 pages).

\* cited by examiner

COLORED RESIN PARTICLE DISPERSION AND INKJET INK

CROSS REFERENCE TO RELATED APPLICATIONS

This Application is based upon and claims the benefit of priority from prior Japanese Patent Applications No. 2014-005753 filed on Jan. 16, 2014, the entire contents of which are incorporated by reference herein.

BACKGROUND OF THE INVENTION

Field of the Invention

The present invention relates to a colored resin particle dispersion and an inkjet ink.

Description of the Related Art

The colorants for printing inks can be broadly classified into dyes and pigments. Using a dye offers the advantage of particularly favorable color development. Further, compared with pigments, dyes offer the advantage of superior abrasion resistance, and particularly superior rub fastness. However, dyes themselves exhibit inferior water resistance and marker resistance. On the other hand, pigments offer the advantages of high image density and excellent weather resistance, but exhibit inferior abrasion resistance, and particularly rub fastness, compared with dyes.

In light of these properties, a method has been proposed in which by encapsulating the colorant within a resin to form colored resin particles, an ink can be provided which exhibits excellent abrasion resistance, water resistance and marker resistance, while retaining the image-forming properties of the colorant. It is desirable that the resin has properties which impart the ink with abrasion resistance, water resistance and marker resistance.

Patent Document 1, Patent Document 2 and Non-Patent Document 1 each proposes the production of a polymer particle dispersion in which by using an organic solvent A and an organic solvent B having almost no compatibility with the organic solvent A, forming a dispersion composed of a dispersed phase containing the organic solvent B and a resin and a continuous phase containing the organic solvent A, and then removing the organic solvent B from the dispersion under reduced pressure or heating, a polymer particle dispersion is produced containing polymer particles dispersed in the organic solvent A.

In other words, a method is proposed in which a liquid, prepared by dissolving and incorporating within the organic solvent B a resin that does not dissolve in the organic solvent A, is dispersed within a continuous phase of the organic solvent A, and the organic solvent B is then removed under reduced pressure or heating, thus obtaining a polymer particle dispersion in which polymer particles are dispersed stably within the organic solvent A.

In terms of the resin for the dispersed phase, styrene-maleic acid copolymer resins are used in the examples of Patent Document 1, styrene-maleic acid copolymer resins and polyvinylpyrrolidone are used in the examples of Patent Document 2, and polyvinylpyrrolidone is used in Non-Patent Document 1. These resins include resins having polar groups that undergo negative dissociation and resins having polar groups that undergo positive dissociation, thus forming polymer particles having negative or positive charges, and providing stable dispersions.

Patent Document 3 proposes the production of a polymer particle dispersion in which by using an organic solvent A and an organic solvent B having almost no compatibility with the organic solvent A, forming a dispersion composed of a dispersed phase containing the organic solvent B, a polyfunctional monomer or resin and a polymerization initiator, and a continuous phase containing the organic solvent A, subsequently initiating a crosslinking reaction by light or heat, and then removing the organic solvent B from the dispersion under reduced pressure or heating, a polymer particle dispersion is produced containing polymer particles dispersed in the organic solvent A.

Based on the above documents, it is hoped that polymer particle dispersions will enable the stable dispersion of polymer particles from the nano level to the micro level, for use as coloring materials not only in inks and copy toners, but also within all manner of coating materials, colored liquid crystals, color filters for portable terminals, electronic books and electronic papers.

[Patent Document 1] JP 2007-197632 A
[Patent Document 2] JP 2005-255911 A
[Patent Document 3] JP 2007-197633 A
[Non-Patent Document 1] Japanese Journal of Polymer Science and Technology, Vol. 62, No. 7, pp. 310 to 315 (July, 2005)

However, no investigations were conducted in the above documents regarding the abrasion resistance, the water resistance and the marker resistance of images printed on paper or the like when a printing ink was prepared using the above types of polymer particle dispersions. Obtaining satisfactory abrasion resistance for the image simply by adding a resin is difficult. Further, a problem arises in that when a resin is used which provides improved abrasion resistance, water resistance and marker resistance for the ink, maintaining the stability of the dispersion is problematic.

Further, the method of Patent Document 3 requires a polymerization reaction of the polyfunctional monomer or resin within the dispersed phase, meaning more production steps are required in producing the polymer particle dispersion.

Furthermore, it is desirable that the dispersion stability of the colored resin particles in the dispersion is favorable, and that the dispersion exhibits excellent storage stability. When a pigment is incorporated into the colored resin particles, the dispersion stability tends to become problematic.

An object of the present invention is to provide a colored resin particle dispersion and an ink which provide excellent abrasion resistance of the printed items. Moreover, another object of the present invention is to provide a colored resin particle dispersion and an inkjet ink which exhibit excellent abrasion resistance, water resistance and marker resistance, as well as favorable storage stability.

SUMMARY OF THE INVENTION

One aspect of the present invention is a colored resin particle dispersion comprising colored resin particles, a basic dispersant, and a non-aqueous solvent, wherein the colored resin particles comprise a colorant and a crosslinked solid resin.

Another aspect of the present invention is an inkjet ink comprising the above colored resin particle dispersion.

DETAILED DESCRIPTION OF THE EMBODIMENTS

A colored resin particle dispersion according to one embodiment of the present invention (hereafter sometimes referred to as simply "the dispersion") comprises colored resin particles, a basic dispersant, and a non-aqueous solvent, wherein the colored resin particles comprise a colorant and a crosslinked solid resin (hereafter sometimes referred to as simply "the crosslinked resin").

As a result, a colored resin particle dispersion and an ink can be provided which provide excellent abrasion resistance of the printed items. Moreover, a colored resin particle dispersion and an inkjet ink which exhibit excellent abrasion resistance, water resistance and marker resistance, as well as favorable storage stability are provided.

According to this embodiment, by incorporating the colorant and the crosslinked resin in the colored resin particles, the particles are formed with the colorant encapsulated by the crosslinked resin, which enables the abrasion resistance of the printed items to be enhanced. Because the solid resin is crosslinked inside the colored resin particles, the abrasion resistance of the printed items can be improved compared with the case when only a solid resin is included.

Further, compared with the case where only a solid resin is included in the colored resin particles, crosslinking the solid resin enhances the dispersion stability of the dispersion, and also enables the storage stability to be improved. In particular, the stability at high temperatures of about 70° C. can be improved, and therefore when the dispersion is installed in a printing device as an ink, the onboard stability of the ink can be maintained favorably.

Furthermore, by encapsulating the colorant in the crosslinked resin, the marker resistance of the printed items can be enhanced. When a printed item is marked with a marker, the printed item is scraped by the marker, and in some cases the solvent and ink incorporated within the marker may act upon the printed item. By encapsulating the colorant in the crosslinked resin, the rub fastness and the solvent resistance can both be further enhanced. By crosslinking the sold resin inside the colored resin particles, the colorant and the solid resin are blended more stably, and therefore the rub fastness and solvent resistance can be further enhanced, and the marker resistance can be further improved.

Further, even in those cases where a solid resin having water resistance is used as the solid resin, by crosslinking the solid resin inside the colored resin particles, the colorant and the solid resin can be blended in a more stable manner. As a result, by using a solid resin having water resistance, a colored resin particle dispersion can be provided which not only imparts abrasion resistance to the printed items, but also yields excellent water resistance.

(Colored Resin Particles)

The colored resin particles in the present embodiment comprise a colorant and a crosslinked solid resin (crosslinked resin).

These colored resin particles preferably have a particle shape in which the colorant and the crosslinked resin are mixed uniformly.

The crosslinked solid resin preferably has a network structure in which the solid resin is crosslinked by crosslinking bonds. The crosslinked solid resin can be formed by a reaction between a reactive solid resin and a crosslinking agent. The crosslinking agent is preferably a compound having a functional group that can react with the reactive solid resin.

These crosslinking bonds preferably occur between the solid resin incorporated within a single colored resin particle, and the occurrence of crosslinked bonding of the solid resin between a plurality of colored resin particles is undesirable.

Solid Resin

The solid resin is preferably a resin that is solid at room temperature (23° C.).

In order to ensure stability of the particle shape, the glass transition temperature (Tg) of the solid resin is preferably at least 30° C., and more preferably 40° C. or higher. The glass transition temperature of the solid resin is not particularly limited, but is preferably not higher than 150° C., and is more preferably 120° C. or lower.

Further, in order to ensure stability of the particle shape, the melting temperature (Tm) of the solid resin is preferably at least 30° C., and more preferably 40° C. or higher. The melting temperature of the solid resin is not particularly limited, but is preferably not higher than 250° C., and is more preferably 200° C. or lower.

The weight-average molecular weight of the solid resin is preferably from 3,000 to 100,000, and more preferably from 5,000 to 80,000. Within this range, the stability of the shape of the colored resin particles can be enhanced. Further, in the production process for the colored resin particles, the raw materials including the solid resin can be mixed more uniformly with the solvent, and as a result, colored resin particles in which the components are more uniformly dispersed can be provided.

The weight-average molecular weight of the resin can be determined by the GPC method, and is calculated relative to standard polystyrenes. This also applies below.

The solid resin preferably has a Hansen solubility parameter (HSP value) of 22 to 27 MPa/cm$^3$. Further, the solid resin preferably has a dispersion parameter $\delta d$ of 13 to 20, a polar parameter $\delta p$ of 5 to 12, and a hydrogen bonding parameter $\delta h$ of 10 to 20. By ensuring these ranges are satisfied, the colored resin particles and the non-aqueous solvent can be separated rapidly when an ink composed of the colored resin particle dispersion is applied to a paper, thus enabling a greater improvement in the abrasion resistance.

The method used for calculating the solubility parameter is described below. In the present invention, the three-dimensional solubility parameter proposed by Hansen in 1967 is used.

The Hansen solubility parameter divides the solubility parameter introduced by Hildebrand into 3 components, namely the dispersion parameter $\delta d$, the polar parameter $\delta p$, and the hydrogen bonding parameter $\delta h$, and is represented within a three-dimensional space. The dispersion parameter indicates the effects due to dispersive forces, the polar parameter indicates the effects due to dipolar intermolecular forces, and the hydrogen bonding parameter indicates the effects due to hydrogen bonding forces. A more detailed description is provided in "Polymer Handbook. Fourth Edition (Editors: J. Brandrup, E. H. Immergut, and E. A. Grulke)" or the like.

As described below, the Hansen solubility parameter can be determined experimentally.

First, the solubility (10 mass %) of a target substance (such as a solid resin) in the solvents shown in Table 1, for which the dispersion parameter $\delta d$, the polar parameter $\delta p$ and the hydrogen bonding parameter $\delta h$ are already known, is investigated. Subsequently, the ranges (minimum values and maximum values) for the dispersion parameter $\delta d$, the polar parameter $\delta p$ and the hydrogen bonding parameter $\delta h$ that correspond with those solvents which dissolve the target substance are determined, and the values in the middle of those ranges (the central values of the three-dimensional solubility parameter ranges) are used as the three-dimensional solubility parameters for the target substance. In other words, the largest rectangular prism for which good solvents fall inside the prism and poor solvents fall outside the prism is determined, and the center of that rectangular prism is defined as the solubility parameter (HSP value) for the target substance.

dispersion parameter $\delta d=(\delta d_{max}-\delta d_{min})/2$
polar parameter $\delta p=(\delta p_{max}-\delta p_{min})/2$
hydrogen bonding parameter $\delta h=(\delta h_{max}-\delta h_{min})/2$
$HSP^2=\delta d^2+\delta p^2+\delta h^2$ The solvents selected for the solubility tests preferably have solubility parameters (HSP values) positioned in very different three-dimensional spaces. Table 1 shows the solubility parameter (HSP value), the dispersion parameter δd, the polar parameter δp and the hydrogen bonding parameter δh for various solvents.

TABLE 1

List of solvents used in solubility tests

| Solvent | HSP (MPa/cm³) | δd | δp | δh |
|---|---|---|---|---|
| n-heptane | 15.3 | 15.3 | 0.0 | 0.0 |
| tetrachloroethylene | 18.7 | 18.0 | 5.0 | 0.0 |
| cyclohexane | 16.8 | 16.8 | 0.0 | 0.2 |
| toluene | 18.2 | 18.0 | 1.4 | 2.0 |
| tetrahydronaphthalene | 19.8 | 19.6 | 0.0 | 2.9 |
| α-bromonaphthalene | 20.9 | 20.3 | 3.1 | 4.1 |
| diisobutyl ketone | 16.9 | 16.0 | 3.7 | 4.1 |
| propylene carbonate | 27.3 | 20.1 | 18.0 | 4.1 |
| methyl isobutyl ketone | 17.0 | 15.3 | 6.1 | 4.1 |
| methyl ethyl ketone | 19.1 | 16.0 | 9.0 | 5.1 |
| chloroform | 18.9 | 17.8 | 3.1 | 5.7 |
| acetonitrile | 24.4 | 15.3 | 18.0 | 6.1 |
| dichloromethane | 20.2 | 18.2 | 6.3 | 6.1 |
| butyl acetate | 17.4 | 15.8 | 3.7 | 6.3 |
| acetone | 19.9 | 15.5 | 10.4 | 7.0 |
| ethyl acetate | 18.2 | 15.8 | 5.3 | 7.2 |
| N-methylpyrrolidone | 23.0 | 18.0 | 12.3 | 7.2 |
| 1,4-dioxane | 20.5 | 19.0 | 1.8 | 7.4 |
| γ-butyrolactone | 26.3 | 19.0 | 16.6 | 7.4 |
| tetrahydrofuran | 19.5 | 16.8 | 5.7 | 8.0 |
| propylene glycol monomethyl ether acetate | 19.3 | 15.6 | 5.6 | 9.8 |
| dimethyl sulfoxide | 26.7 | 18.4 | 16.4 | 10.2 |
| butyl carbitol | 20.4 | 16.0 | 7.0 | 10.6 |
| diacetone alcohol | 20.8 | 15.8 | 8.2 | 10.8 |
| dimethylformamide | 24.9 | 17.4 | 13.7 | 11.3 |
| propylene glycol monomethyl ether | 20.4 | 15.6 | 6.3 | 11.6 |
| 2-ethylhexanol | 20.2 | 16.0 | 3.3 | 11.9 |
| 2-ethylbutanol | 21.2 | 15.8 | 4.3 | 13.5 |
| cyclohexanol | 22.4 | 17.4 | 4.1 | 13.5 |
| n-pentanol | 21.7 | 16.0 | 4.5 | 13.9 |
| 2-phenoxyethanol | 23.5 | 17.8 | 5.7 | 14.3 |
| 1-butanol | 23.2 | 16.0 | 5.7 | 15.8 |
| methyl cellosolve | 24.8 | 16.2 | 9.2 | 16.4 |
| isopropyl alcohol | 23.6 | 15.8 | 6.1 | 16.4 |
| n-propanol | 24.6 | 16.0 | 6.8 | 17.4 |
| dipropylene glycol | 26.4 | 16.5 | 10.6 | 17.7 |
| ethanol 99.9% | 26.5 | 15.8 | 8.8 | 19.4 |
| diethylene glycol | 29.1 | 16.6 | 12.0 | 20.7 |
| methanol | 29.6 | 15.1 | 12.3 | 22.3 |
| water | 47.9 | 15.5 | 16.0 | 42.3 |

The solid resin is preferably a reactive solid resin having a functional group capable of reacting with a crosslinking agent (hereafter also referred to as simply a "crosslinking reactive group").

The crosslinking reactive group preferably includes, for example, at least one of a carboxyl group, hydroxyl group, amide linkage, epoxy group, amino group, phosphoric acid group, or sulfo group (silanol group, silane group) or the like.

The reactive solid resin preferably has at least two crosslinking reactive groups within each molecule.

Any solid resin having the properties described above can be used favorably, and there are no particular limitations on the type of resin used.

Specific examples of the solid resin include (meth)acrylic-based resins, cellulose-based resins, polyvinyl alcohols, polyvinyl acetal resins, polyamide resins, styrene-maleic acid resins and esterified products thereof, maleic acid resins, alkylphenol resins, rosin resins, vinyl acetate resins and polyhydroxy polyolefins.

Further, resins in which crosslinking reactive groups have been introduced into these solid resins can also be used.

The above resins may be used individually, or a combination of two or more resins may be used.

The term "(meth)acrylic-based resins" means methacrylic resins and/or acrylic resins, and includes polymers containing only methacrylic units or acrylic units, as well as copolymers containing both methacrylic units and acrylic units.

Among the above resins, (meth)acrylic-based resins, the cellulose-based resin nitrocellulose, polyvinyl alcohols, polyvinyl acetal resins, polyamide resins, styrene-maleic acid resins, and esterified products of styrene-maleic acid resins and the like can be used favorably as the reactive solid resin.

Examples of resins that can be used as the (meth)acrylic-based resin include not only (meth)acrylic resins having methacrylic units and/or acrylic units, but also copolymers having other units in addition to the methacrylic units and/or acrylic units. Examples of these other units include styrene-based units, vinyl carboxylate units, α-olefin units, diene-based units, ethylenic unsaturated acid units, ethylenic unsaturated acid anhydride units, unsaturated carboxylic acid monoalkyl ester units, sulfonic acid units, nitrogen-containing units such as nitrile, pyridine and pyrrolidone, and ether-based units.

The (meth)acrylic-based resins can be obtained by polymerization of a conventional (meth)acrylic monomer. Examples of the (meth)acrylic monomer include:

(meth)acrylic acid;

alkyl (meth)acrylate esters in which the alkyl group is a hydrocarbon group having a carbon number of 1 to 22, such as methyl (meth)acrylate, ethyl (meth)acrylate, n-propyl (meth)acrylate, isopropyl (meth)acrylate, n-butyl (meth)acrylate, isobutyl (meth)acrylate, sec-butyl (meth)acrylate, tert-butyl (meth)acrylate, n-hexyl (meth)acrylate, n-octyl (meth)acrylate, isooctyl (meth)acrylate, 2-ethylhexyl (meth)acrylate, n-nonyl (meth)acrylate, isononyl (meth)acrylate, decyl (meth)acrylate, dodecyl (meth)acrylate, stearyl (meth)acrylate, octadecyl (meth)acrylate, and cyclohexyl (meth)acrylate;

phenyl (meth)acrylate and benzyl (meth)acrylate;

hydroxyalkyl (meth)acrylate esters of hydrocarbon groups having a carbon number of 2 to 8, such as 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate and 4-hydroxybutyl (meth)acrylate;

mono (meth)acrylates of polyalkylene glycols (in which the number of alkylene glycol units is 2 or greater), such as polyethylene glycol mono(meth)acrylate, polypropylene glycol mono(meth)acrylate, polybutylene glycol mono(meth)acrylate, polyethylene glycol polypropylene glycol mono(meth)acrylate, polyethylene glycol polybutylene glycol mono(meth)acrylate, polypropylene glycol polybutylene glycol mono(meth)acrylate, and polyethylene glycol polypropylene glycol polybutylene glycol mono(meth)acrylate;

(meth)acrylate esters containing a polyalkylene oxide skeleton, including mono(meth)acrylate esters of alkoxy-polyalkylene glycols such as methoxypolyethylene glycol mono(meth)acrylate, methoxypolypropylene glycol mono (meth)acrylate, methoxypolybutylene glycol mono(meth) acrylate, ethoxypolyethylene glycol mono(meth)acrylate, ethoxypolypropylene glycol mono(meth)acrylate, and ethoxypolybutylene glycol mono(meth)acrylate;

nitrogen-containing monomers such as (meth)acrylamide, dimethylaminoethyl (meth)acrylate, N-butoxymethylacrylamide, and N,N-dimethylacrylamide;

epoxy group-containing (meth)acrylates such as glycidyl (meth)acrylate, methylglycidyl (meth)acrylate and 3,4-epoxycyclohexylmethyl (meth)acrylate; and unsaturated sulfonic acids such as sulfoethyl acrylate and (meth)acryloyloxybenzenesulfonic acid.

Combinations of two or more of these monomers may also be used.

Further, monomers other than the (meth)acrylic monomer (hereafter referred to as "other monomers") can be used in combination with the (meth)acrylic monomer. There are no particular limitations on the other monomer, provided it is copolymerizable with the (meth)acrylic monomer, and examples include styrene-based monomers such as styrene and α-methylstyrene, vinyl carboxylate esters such as vinyl acetate and vinyl propionate, α-olefin monomers such as ethylene, propylene and butene-1, diene-based monomers such as butadiene and isoprene, ethylenic unsaturated acids and anhydrides thereof such as crotonic acid, maleic acid, maleic anhydride, itaconic acid and itaconic anhydride, unsaturated carboxylic acid monoalkyl esters such as maleic acid monoesters, fumaric acid monoesters and itaconic acid monoesters, nitrogen-containing unsaturated monomers such as (meth)acrylonitrile, vinylpyridine and vinylpyrrolidone, unsaturated sulfonic acids such as (meth)allyl sulfonic acid, vinyl sulfonic acid, α-styrene sulfonic acid and 2-acrylamido-2-methylpropane sulfonic acid, and vinyl ether-based monomers such as vinyl ethyl ether, vinyl isobutyl ether and vinyl phenyl ether. Combinations of two or more of these monomers may also be used.

The (meth)acrylic-based resin preferably has a number-average molecular weight (Mn) of 5,000 to 25,000, and preferably has an acid value of 0 to 300 mgKOH/g, and more preferably 30 to 300 mgKOH/g.

Furthermore, a (meth)acrylic-based resin having styrene units can be used favorably as a styrene-(meth)acrylic-based resin. In this case, the ratio (molar ratio) between the styrene units and the (meth)acrylic units is preferably from 0:10 to 7:3.

Examples of commercially available (meth)acrylic-based resins that can be used include "UC-3000" from the ARUFON series manufactured by Toagosei Co., Ltd., and "TS-1315" and "RS-1190" and the like from the HIROS-X series manufactured by Seiko PMC Corporation, whereas examples of commercially available styrene-(meth)acrylic-based resins that can be used include "UC-3920" and "UC-5041" from the ARUFON series manufactured by Toagosei Co., Ltd., and "VS-1047" and "VS-1291" and the like from the HIROS-X series manufactured by Seiko PMC Corporation.

Examples of the cellulose-based resins include cellulose acetate resins, cellulose acetate butyrate resins, cellulose acetate propionate resins and nitrocellulose.

Examples of compounds that can be used as the nitrocellulose include compounds in which one, two, or all three of the hydroxyl groups in each glucose unit that constitutes the cellulose have been nitrated.

The degree of nitration of the nitrocellulose is preferably within a range from 10.7% to 12.2%, and is particularly preferably within a range from 10.7% to 11.4%. This enables the colored resin particle dispersion to be prepared in a more stable manner, and enables the abrasion resistance of the printed items to be further enhanced.

Polyvinyl alcohols are generally produced using a polyvinyl acetate as a raw material, by substituting the acetate groups of the polyvinyl acetate with hydroxyl groups, and are therefore resins which contain acetate groups as well as hydroxyl groups depending on the degree of substitution.

If the molar ratio of units having a hydroxyl group relative to the combined total of all the units that constitute the polyvinyl alcohol is termed n, and the molar ratio of units having an acetate group (—O—CO—CH$_3$) is termed m, then the degree of saponification is represented by (n/(n+m))×100, and the polymerization degree is represented by n+m.

The degree of saponification (n/(n+m))×100 for the polyvinyl alcohol is preferably from 0 to 60, and more preferably from 1 to 50.

The polymerization degree (n+m) of the polyvinyl alcohol is preferably from 10 to 1,000, and more preferably from 20 to 500.

For the polyvinyl acetal resin, a resin produced by acetalization of a polyvinyl alcohol (PVA) resin can be used. Specifically, by reacting a PVA resin with an aldehyde in the presence of an acid catalyst, some or all of the hydroxyl groups of the PVA resin are acetalized, enabling the production of a polyvinyl acetal resin.

The degree of saponification (n/(n+m)×100) of the polyvinyl alcohol required when preparing the polyvinyl acetal resin is preferably at least 2, and more preferably 5 or greater. This type of hydroxyl group proportion is most suited to acetalization.

Further, the polymerization degree (n+m) of the polyvinyl alcohol is preferably from 10 to 1,000, and more preferably from 20 to 500.

Examples of compounds that can be used as the aldehyde include formaldehyde, acetaldehyde, para-formaldehyde, trioxane, tetraoxane, propionaldehyde and butyraldehyde.

Furthermore, alicyclic aldehydes and aromatic aldehydes may also be used as the aldehyde.

Examples of the alicyclic aldehydes include cyclohexane carboxaldehyde, 5-norbornene-2-carboxaldehyde, 3-cyclohexene-1-carboxaldehyde, and dimethyl-3-cyclohexene-1-carboxaldehyde.

Examples of the aromatic aldehydes include 2,4,6-trimethylbenzaldehyde (mesitaldehyde), 2,4,6-triethylbenzaldehyde, 2,6-dimethylbenzaldehyde, 2-methylbenzaldehyde, 2-methoxy-1-naphthaldehyde, 2-ethoxy-1-naphthaldehyde, 2-propoxy-1-naphthaldehyde, 2-methyl-1-naphthaldehyde, 2-hydroxy-1-naphthaldehyde, as well as 1-naphthaldehydes having substituent(s), 2-naphthaldehydes having substituent(s), 9-anthraldehyde, and 9-anthraldehydes having substituent(s).

A ketone may be used in addition to, or instead of, the aforementioned aldehyde.

Examples of the ketone include acetophenones such as 2-methylacetophenone and 2,4-dimethylacetophenone, and naphthones such as 2-hydroxy-1-acetonaphthone, 8'-hydroxy-1'-benzonaphthone and acetonaphthone.

These aldehydes and ketones may be used individually, or combinations may be used.

The polyvinyl acetal resin preferably has a degree of acetalization of 40 to 95 mol %, and more preferably 50 to 85 mol %. This ensures that when the solid resin is mixed with the colorant and the solvent and the like during the production process for the colored resin particles, the solubility of the solid resin in the solvent can be improved. As a result, the uniformity of the components within the colored resin particles and the stability of the shape of the particles can be enhanced.

The degree of acetalization of the polyvinyl acetal resin can be represented by the proportion of hydroxyl groups within the polyvinyl alcohol resin that have been acetalized. In the case of a polyvinyl butyral resin, the degree of acetalization can be measured in accordance with JIS K6728.

When the polyvinyl alcohol resin is acetalized with butyraldehyde, this degree of acetalization can be termed the degree of butyralization. This degree of butyralization preferably satisfies the same range as that mentioned above for the degree of acetalization.

In the polyvinyl acetal resin, the proportion of hydroxyl groups is preferably not more than 60 mol %, and more preferably 50 mol % or less. This ensures that when the solid resin is mixed with the colorant and the solvent and the like during the production process for the colored resin particles, the solubility of the solid resin in the solvent can be improved. As a result, the uniformity of the components within the colored resin particles and the stability of the shape of the particles can be enhanced.

Here, the proportion of hydroxyl groups in the solid resin can be represented by the ratio of the units having a hydroxyl group (mol) relative to the total of all the units (mol) that constitute the solid resin. This definition also applies below.

For the polyvinyl acetal resin, a polyvinyl butyral resin (hereafter sometimes referred to as simply a "butyral resin") obtained by acetalizing a polyvinyl alcohol resin with butyraldehyde, or a polyvinyl formal resin (vinylon) obtained by acetalizing a polyvinyl alcohol resin with formaldehyde can be used favorably.

Examples of commercially available polyvinyl butyral resins that can be used include "BL-2H", "BL-10", "BL-S", "BM-1", "BM-2", "MN-6", and "BX-L" and the like from the S-LEC B series manufactured by Sekisui Chemical Co., Ltd., and "16H", "20H", "30T", "30H", "30HE", "45M", and "45H" and the like from the Mowital B series manufactured by Kuraray Co., Ltd.

Examples of commercially available polyvinyl formal resins that can be used include "Vinylec K" and "Vinylec C" and the like from the Vinylec series manufactured by INC Corporation, and Vinylon fiber and the like manufactured by Kuraray Co., Ltd.

These products may be used individually, or combinations of two or more products may be used.

Examples of products that can be used as the polyamide resin include nylon-6, nylon-66, nylon 4-6, and copolymer nylons.

Further, polyamide resins having alkoxy groups, obtained by alkoxymethylation of a polyamide resin, can also be used.

By alkoxymethylating a polyamide resin, the solubility in alcohol solvents can be enhanced. Accordingly, during the production process for the colored resin particles, the colorant and the resin fraction can be mixed more uniformly and stably within the solvent.

Examples of the alkoxymethyl groups include a methoxymethyl group and an ethoxymethyl group and the like.

Examples of commercially available polyamide resins include the Tohmide series and PA series manufactured by T&K TOKA Corporation, "FR-101", "FR-104", "FR-105", and "FR-301" and the like from the Fine Resin series manufactured by Namariichi Co., Ltd., and "Toresin F-30K" and "Toresin EF-30T" and the like manufactured by Nagase ChemteX Corporation.

The styrene-maleic acid resins are copolymers of styrene and maleic anhydride. Further, the esterified products of styrene-maleic acid resins are resins obtained by esterifying a styrene-maleic acid resin to introduce carboxyl groups or hydroxyl groups.

Examples of commercially available styrene-maleic acid resins and esterified products thereof that can be used include styrene-maleic acid resin esterified products such as "SMA1440F", "SMA1440", "SMA17352", "SMA2625", and "SMA3840" and the like from the SMA Resin series manufactured by Kawahara Petrochemical Co., Ltd., and styrene-maleic acid resins such as the "SMA1000" series, the "SMA2000" series, and the "SMA3000" series and the like of SMA Resins manufactured by Kawahara Petrochemical Co., Ltd.

The alkylphenol resin may be either a novolac-type alkylphenol resin or a resol-type alkylphenol resin, or a combination of these types may be used.

A novolac-type alkylphenol resin can be produced by reacting an alkylphenol and an aldehyde in the presence of an acid catalyst.

A resol-type alkylphenol resin can be produced by reacting an alkylphenol and an aldehyde in the presence of an alkali catalyst.

Further, a modified alkylphenol resin may also be used. Examples of modified alkylphenol resins include rosin-modified alkylphenol resins, and alkoxy group-containing silane-modified alkylphenol resins.

The raw material alkylphenol preferably has an alkyl group with a carbon number of 1 to 12. Specific examples of compounds that can be used as the alkylphenol include o-cresol, m-cresol, p-cresol, xylenol, ethylphenol, propylphenol, butylphenol, amylphenol, octylphenol, nonylphenol, dodecylphenol, bisphenol A, bisphenol B, bisphenol C, bisphenol E and bisphenol F. These compounds may be used individually, or a combination of two or more compounds may be used. There are no limitations on the position of the substituent(s) in these alkylphenols.

Examples of compounds that can be used as the aldehyde include formaldehyde, acetaldehyde, butyraldehyde, paraformaldehyde, trioxane and tetraoxane, or combinations of these compounds.

The blend amount of the solid resin described above, relative to the total mass of the colored resin particles, is preferably at least 10 mass %, and more preferably 20 mass % or greater.

On the other hand, the blend amount of the solid resin relative to the total mass of the colored resin particles is preferably not more than 70 mass %, and more preferably 50 mass % or less.

The colored resin particles may also contain one or more other resins besides the resin described above, provided that the effects of the present invention are not impaired. As described below in the method of producing the colored resin particle dispersion, examples of these other resins include pigment dispersants and additives and the like.

Crosslinking Agent

There are no particular limitations on the crosslinking agent used for crosslinking the aforementioned reactive solid resin, and a crosslinking agent having a functional group that exhibits reactivity with the crosslinking reactive groups of the reactive solid resin can be used.

The crosslinking agent preferably has at least two of these reactive functional groups within each molecule.

Examples of the crosslinking agent include carbodiimide-based compounds, aziridine-based compounds, metal chelate-based compounds, isocyanate-based compounds, melamine-based compounds, epoxy-based compounds, oxazoline-based compounds, urea-based compounds, polyamine-based compounds, polyethyleneimine-based compounds and acrylamide-based compounds. These compounds may be used individually, or combinations of two or more compounds may be used.

The carbodiimide-based compounds are compounds having a carbodiimide group represented by —N=C=N— within the molecule.

For example, cyclic carbodiimides, isocyanate-terminated carbodiimides, dicyclohexylcarbodiimide, diisopropylcarbodiimide, amino group-containing carbodiimides, 1-ethyl-3-(3-dimethylaminopropyl)carbodiimide hydrochloride, N-t-butyl-N-ethylcarbodiimide and di-t-butylcarbodiimide and the like can be used.

Examples of commercially available carbodiimide-based compounds that can be used include "V-02B" and "V-04K" and the like from the Carbodilite series manufactured by Nisshinbo Chemical Inc.

The aziridine-based compounds are compounds having an aziridinyl group within the molecule, and the use of polyfunctional aziridine-based compounds having two or more aziridinyl groups within each molecule is preferred.

For example, 2,2-bishydroxymethylbutanol-tris[3-(1-aziridinyl)propionate] and 4,4-bis(ethyleneiminocarbonylamino)diphenylmethane and the like can be used.

Examples of commercially available aziridine-based compounds that can be used include "PZ-33" and "DZ-22E" and the like from the Chemitite series manufactured by Nippon Shokubai Co., Ltd.

For the metal chelate-based compounds, chelate compounds which use a metal element such as titanium, aluminum, iron, copper, zinc, tin, nickel, antimony, magnesium, vanadium, chromium or zirconium can be used.

For example, titanium chelate compounds such as titanium diisopropoxy-bis(triethanolaminate) and titanium tetraacetylacetonate, zirconium chelate compounds such as zirconium tetraacetylacetonate, and aluminum compounds such as aluminum alkylacetoacetate-diisopropylate and the like can be used.

Examples of commercially available metal chelate-based compounds that can be used include "TC-400", "TC-401" and "ZC-150" from the Orgatix series manufactured by Matsumoto Fine Chemical Co., Ltd., and "Alumichelate D" and "Alumichelate M" and the like manufactured by Kawaken Fine Chemical Co., Ltd.

The isocyanate-based compounds are compounds having an isocyanate group within the molecule, and the use of compounds having two or more isocyanate groups within each molecule is preferable.

For example, ethylene diisocyanate, 1,6-hexamethylene diisocyanate, isophorone diisocyanate, tetramethylxylene diisocyanate, 1,4-phenylene diisocyanate, 2,4-toluene diisocyanate, 2,6-toluene diisocyanate, and 4,4'-diphenylmethane diisocyanate and the like can be used.

Examples of compounds that can be used as the melamine-based compounds include methylated melamine compounds, butylated melamine compounds, etherified methylolmelamine, benzoguanamine, methylol benzoguanamine, and etherified methylol benzoguanamine.

Examples of compounds that can be used as the epoxy-based compounds include ethylene glycol diglycidyl ether, polyethylene glycol diglycidyl ether, glycerin triglycidyl ether, polyglycerol polyglycidyl ether, alicyclic epoxy compounds, and dicyclopentadiene-type epoxy compounds and the like.

The oxazoline-based compound is preferably a polymer having oxazoline groups. The polymer having oxazoline groups is preferably a polymer produced by polymerizing a monomer component containing an addition-polymerizable oxazoline as an essential component. Specific examples of addition-polymerizable oxazoline group-containing monomers include 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, and 2-isopropenyl-5-ethyl-2-oxazoline.

Examples of commercially available oxazoline-based compounds that can be used include "Epocros WS-300, 500, 700", "Epocros K-1010, 1020, 1030E" and "Epocros K-2010, 2020, 2030" manufactured by Nippon Shokubai Co., Ltd.

For example, when a solid resin having carboxyl groups is used as the solid resin for the colored resin particles, a carbodiimide-based compound, aziridine-based compound, or oxazoline-based compound or the like is preferably used as the crosslinking agent.

When a solid resin having hydroxyl groups is used as the solid resin for the colored resin particles, a metal chelate-based compound or isocyanate-based compound or the like is preferably used as the crosslinking agent.

From the viewpoint of ensuring favorable abrasion resistance for the printed items, the blend amount of the crosslinking agent is preferably at least 0.01 parts by mass, and more preferably 0.5 parts by mass or greater, per 1 part by mass of the solid resin. On the other hand, the blend amount of the crosslinking agent is preferably not more than 2 parts by mass, and more preferably 1.95 parts by mass or less, per 1 part by mass of the solid resin.

Further, relative to the total mass of the colored resin particles, the crosslinking agent is preferably included in an amount of 1 to 40 mass %, and more preferably 5 to 30 mass %.

One embodiment of the crosslinked solid resin is a resin obtained by crosslinking a solid resin having carboxyl groups using a carbodiimide-based compound as the crosslinking agent. In this embodiment, the resin includes crosslinking bond moieties represented by general formula (1) shown below. In general formula (1), R represents an alkyl group, aralkyl group, cycloalkyl group, cycloalkenyl group, substituted or unsubstituted aryl group, or alkenyl group or the like.

[Chemical Formula 1]

General formula (1)

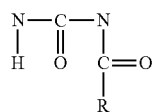

Another embodiment of the crosslinked solid resin is a resin obtained by crosslinking a solid resin having carboxyl groups using an aziridine-based compound as the crosslinking agent. In this embodiment, the resin includes crosslinking bond moieties represented by general formula (2) shown below. In general formula (2), each R independently represents an alkyl group, aralkyl group, cycloalkyl group, cycloalkenyl group, substituted or unsubstituted aryl group, or alkenyl group or the like.

[Chemical Formula 2]

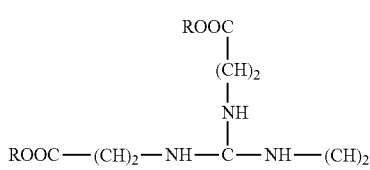

General formula (2)

Yet another embodiment of the crosslinked solid resin is a resin obtained by crosslinking a solid resin having hydroxyl groups using a metal chelate-based compound as the crosslinking agent. In this embodiment, the resin includes crosslinking bond moieties represented by general formula (3-1) and/or general formula (3-2) shown below. In general formula (3-1) and/or general formula (3-2), Me represents any of various metal atoms such as a titanium or aluminum atom.

[Chemical Formula 3]

General formula (3-1)

General formula (3-2)

Colorant

The colorant incorporated in the colored resin particles may be either a pigment or a dye, or a combination of the two. Details are described below.

From the viewpoints of the coloring properties and the uniformity of the components, the colorant is preferably blended in an amount of 0.1 to 50 mass %, and more preferably 1 to 40 mass %, relative to the total mass of the colored resin particles.

Acidic Compound

In addition to the colorant and the crosslinked resin described above, the colored resin particles may also include a liquid organic compound having an acidic group (hereafter sometimes referred to as simply an "acidic compound"). Here, a liquid organic compound having an acidic group refers to an organic compound which is liquid at 23° C. and contains an acidic group.

By adding an acidic compound, the abrasion resistance of the printed items can be further improved. This is because the acidic compound enables the solid resin to be blended more uniformly and stably. In particular, the abrasion resistance a short time after printing can be improved.

Further, when a resin having a low acid value and superior water resistance is used as the solid resin, the abrasion resistance can sometimes deteriorate, but by adding an acidic compound together with this type of solid resin, the water resistance and the abrasion resistance can be improved.

Furthermore, the acidic compound can also be added in a method of producing a post-processing agent, for the purpose of maintaining the stability of the oil-in-oil emulsion.

In order to ensure that the acidic compound maintains a liquid state at room temperature, the melting point of the acidic compound is preferably 23° C. or lower, and more preferably 15° C. or lower. Further, the carbon number of the acidic compound is preferably at least 2.

The acidic compound has a solubility in the non-aqueous solvent incorporated within the colored resin particle dispersion that is preferably not more than 3 g/100 g, more preferably 1 g/100 g or less, and even more preferably 0.5 g/100 g or less. It is even more preferable that the acidic compound is selected so that, within the blend of the colored resin particle dispersion, the acidic compound is essentially insoluble in the non-aqueous solvent.

When the acidic compound is dissolved in a non-aqueous solvent, it is preferable that as the concentration of the acidic compound increases, the oxidation-reduction potential (ORP) value increases.

For example, when the acidic compound is dissolved in a solvent capable of dissolving the acidic compound, it is preferable that the ORP value when the acidic compound is dissolved in an amount of 5.0 mass % is higher than the ORP value when the acidic compound is dissolved in an amount of 0.5 mass %.

Further, the ORP value when the acidic compound is dissolved in methanol in an amount of 5.0 mass % is preferably at least 200 mV, and more preferably 300 mV or higher.

On the other hand, if the acidic compound includes a basic group as well as the acidic group, then the compound can still be used favorably as the acidic compound, despite containing a basic group, provided the ORP value exhibits this tendency to increase. It is preferable that the acidic compound does not contain a basic group.

Here, the oxidation-reduction potential (ORP value) describes the value measured at a measurement temperature of 23° C. using a silver electrode as the working electrode and a silver chloride electrode as the reference electrode, with the measurement conducted by inserting the working electrode and the reference electrode in a solution of any of various materials. For example, the oxidation-reduction potential can be measured using a portable pH meter "pH-208" and an ORP electrode "ORP-14" (both manufactured by FUSO Co., Ltd.). This also applies below.

The solubility parameter of the acidic compound is preferably a Hansen solubility parameter (HSP value) of 22 to 27 MPa/cm$^3$. Further, the acidic compound preferably has a dispersion parameter $\delta d$ of 13 to 20, a polar parameter $\delta p$ of 5 to 12, and a hydrogen bonding parameter $\delta h$ of 10 to 20. By ensuring these ranges are satisfied, the components of the colored resin particles can be blended more uniformly, the particle shape can be stabilized and the stability over time can be improved, and the color development and the abrasion resistance can be further improved.

Examples of the acidic group of the acidic compound include a phosphoric acid group, carboxyl group, sulfonic acid group, phosphate ester group, sulfate ester group, nitrate ester group, phosphorous acid group, phosphonic acid group and sulfinic acid group. Any one of these groups, or a combination of two or more groups, may be included within each molecule.

The acidic compound may be an oligomer, a polymer or a low molecular weight compound.

Examples of the oligomer or polymer include (meth) acrylic-based resins, polyester-based resins, polyvinyl-based resins and polyether-based resins and the like, which may be used individually or in combinations. Further, copolymers of the monomers or oligomers that constitute these resins may also be used.

The acidic group may be derived from the monomer that constitutes the oligomer or polymer, thereby introducing an acidic group bonded to the main chain or side chain of each structural unit. Examples include copolymers or the like of a (meth)acrylate ester and (meth)acrylic acid. In such cases, carboxyl groups are introduced in accordance with the proportion of (meth)acrylic acid used. Further examples include copolymers of a (meth)acrylate ester and an acid-phosphoxy-(meth)acrylate. In such cases, phosphoric acid groups are introduced.

Further, the acidic groups may be introduced by phosphorylation of an oligomer or polymer. In such cases, phosphoric acid groups are introduced in accordance with the positions and proportion of hydroxyl groups. When the oligomer or polymer has hydroxyl groups at both terminals, phosphoric acid groups are introduced at both terminals of the oligomer or polymer, meaning the acidic compound has a total of two phosphoric acid groups.

When the acidic compound is an oligomer or a polymer, the weight-average molecular weight is preferably from 500 to 10,000, and more preferably from 1,000 to 5,000.

Specific examples of the oligomer or polymer for the acidic compound include phosphate ester compounds, including polyoxyalkyl phosphate esters such as polyoxyethylene alkyl phosphate esters and polyoxyethylene polyoxypropylene phosphate esters, and polyether polyester phosphate esters; alkyl polyphosphonic acids; and carboxyl group-containing (meth)acrylic polymers. These compounds may be used individually, or a plurality of compounds may be combined.

Low molecular weight compounds such as phosphate esters, sulfate esters, and 1-hydroxyethane-1,1-diphosphonic acid and the like may also be used as the acidic compound.

The acidic compound preferably has an acid value. The acid value of the acidic compound is preferably at least 30 mgKOH/g, more preferably 60 mgKOH/g or higher, and even more preferably 90 mgKOH/g or higher.

Here, the acid value describes the number of milligrams of potassium hydroxide needed to neutralize all of the acidic components within 1 g of the non-volatile fraction of the compound. This definition also applies below.

Among the various possibilities, liquid organic compounds having at least one of a phosphoric acid group, phosphonic acid group, phosphate ester group or carboxyl group, and having an acid value of at least 30 mgKOH/g are preferable, and compounds having one or more phosphoric acid groups are particularly preferred. Further, acidic compounds having a phosphoric acid group at both terminals of the compound are particularly desirable.

Examples of commercially available products that can be used as the acidic compound include:

"DISPERBYK-102, 110, 111" (all product names) manufactured by BYK-Chemie Japan K.K., "TEGO Dispers 655" manufactured by Tomoe Engineering Co., Ltd., "Efka 6230" manufactured by Efka Chemicals B.V., "PH-210" manufactured by Chelest Corporation, "ARUFON UC3510" manufactured by Toagosei Co., Ltd., and "CM294P" manufactured by Unichemical Co., Ltd.

"DISPERBYK-111" is a phosphate ester compound of a block copolymer of ethylene glycol and polycaprolactone, and has phosphoric acid groups at both terminals of the copolymer.

The acidic compound is preferably blended in an amount of 0.1 to 50 mass %, and more preferably 1 to 45 mass %, relative to the total mass of the colored resin particles. This enables the uniformity and stability of the colored resin particle components to be maintained, while avoiding any effects on other raw materials.

Plasticizer

In addition to the acidic compound described above, the colored resin particles may also include a liquid organic compound having no acidic groups (hereafter sometimes referred to as simply a "plasticizer"). This enables the abrasion resistance of the printed items to be further enhanced.

The plasticizer lowers the softening region of the solid resin and imparts plasticity, and therefore by adding the plasticizer when the solid resin and the colorant of the colored resin particles are mixed, the solid resin and the colorant can be mixed together more uniformly. As a result, the components of the colored resin particles are blended more uniformly, and the abrasion resistance can be further enhanced.

The solubility of the plasticizer in the non-aqueous solvent at 23° C. is preferably not more than 3 g/100 g, which enables the solid resin of the colored resin particles to be imparted with plasticity, while preventing dissolution in the non-aqueous solvent, and enabling the shape stability of the colored resin particles to be maintained. Further, when the colored resin particle dispersion is produced, coalescence of the dispersed phase containing the solid resin and the colorant can be prevented, enabling the stability of the oil-in-oil emulsion to be further enhanced. As a result, the components of the colored resin particles can be dispersed more uniformly.

This solubility at 23° C. is more preferably 1 g/100 g or less, and even more preferably 0.5 g/100 g or less. It is most preferable that, in the blend proportions used in the colored resin particle dispersion, the plasticizer is essentially insoluble in the non-aqueous solvent.

The melting point of the plasticizer is preferably 23° C. or lower, and more preferably 15° C. or lower. This enables the solid resin and the colorant of the colored resin particles to be mixed together more uniformly.

The plasticizer may be a low molecular weight compound, a polymer compound, or a combination thereof.

Examples of compounds that can be used as the low molecular weight compound include alcohols, esters, and ethers and the like.

For the alcohols, lower polyhydric alcohols and/or higher polyhydric alcohols can be used favorably. The number of hydroxyl groups in these alcohols is preferably from 1 to 10.

The carbon number of the lower polyhydric alcohols is preferably from 4 to 6.

Specific examples of the lower polyhydric alcohols include diols such as 1,5-pentanediol, 1,6-hexanediol and 3-methyl-1,5-pentanediol.

The carbon number of the higher polyhydric alcohols is preferably from 10 to 250.

Specific examples of the higher polyhydric alcohols include polyols such as castor oil polyols.

For the esters, low molecular weight esters can be used favorably.

The carbon number of these low molecular weight esters is preferably from 8 to 30.

Specific examples of the low molecular weight esters include diisononyl phthalate, di-2-ethylhexyl adipate and diisononyl adipate.

High molecular weight compounds such as polyesters, polyethers and (meth)acrylic polymers can also be used favorably as the plasticizer.

The weight-average molecular weight of these high molecular weight compounds is preferably from 300 to 8,000, and more preferably from 1,000 to 5,000. This enables a good balance to be achieved between the shape stability and the plasticity of the colored resin particles.

Examples of the polyesters include polyester polyols obtained by subjecting a low molecular weight polyol and a dibasic acid to an esterification reaction, polycaprolactone, and poly-β-methyl-δ-valerolactone and the like.

Specific examples of the polyester polyols include adipic acid-diethylene glycol (AA-DEG), adipic acid-neopentyl glycol (AA-NPG), and adipic acid-trimethylolpropane/diethylene glycol (AA-TMP/DEG).

Examples of the polyethers include polyether polyols such as polyethylene glycol, polyoxypropylene glycol and poly(oxytetramethylene) glycol.

Examples of compounds that can be used as the (meth)acrylic polymer include not only (meth)acrylic resins having methacrylic units and/or acrylic units, but also copolymers having other units besides the methacrylic units and/or acrylic units. For example, vinyl acetate units and styrene units and the like can be used as other monomers.

Examples of commercially available (meth)acrylic polymers include "ARUFON UP-1010", "ARUFON UP-1190", "ARUFON UH-2000", "ARUFON UH-2190", "ARUFON UH-2041", "ARUFON UG-4010" and "ARUFON US-6100", all manufactured by Toagosei Co., Ltd.

These plasticizers may be used individually, or combinations of two or more plasticizers may be used.

Among the various possibilities, the use of polyesters, polyethers or (meth)acrylic polymers, either individually or in combinations, is preferable.

The blend amount of the aforementioned plasticizer is preferably from 5 to 40 mass % relative to the total mass of the colored resin particles.

The average particle size of the colored resin particles is preferably not more than about 10 μm, and is more preferably 5 μm or less, and even more preferably 1 μm or less. The average particle size of the colored resin particles may be adjusted appropriately in accordance with the type of recording medium, and for example in order to improve the color development and fixability for printed items using coated paper, this average particle size is preferably about 100 to 250 nm, and from the viewpoint of inhibiting show-through on printed items using plain paper, the average particle size is preferably 140 to 200 nm.

Here, the average particle size of the colored resin particles refers to the volume-based average particle size determined by a dynamic scattering method, and can be measured, for example, using a dynamic light scattering particle size distribution analyzer "LB-500" manufactured by Horiba, Ltd. This also applies below.

(Colored Resin Particle Dispersion)

The colored resin particle dispersion according to the present embodiment comprises a non-aqueous solvent and a basic dispersant in addition to the colored resin particles described above. The non-aqueous solvent and the basic dispersant are as described below in relation to the method of producing the colored resin particle dispersion. The non-aqueous solvent is preferably a solvent capable of dispersing the colored resin particles. The basic dispersant is added for the purpose of dispersing the colored resin particles in the non-aqueous solvent. Further, the basic dispersant is sometimes added to adjust the emulsion in the production process for the colored resin particles described below.

From the viewpoint of dispersibility, the basic dispersant is preferably added in an amount of 0.1 to 20 mass %, and more preferably 1 to 15 mass %, relative to the total mass of the dispersion.

In the colored resin particle dispersion according to the present embodiment, the amount of the colored resin particles relative to the total mass of the dispersion is preferably at least 1 mass %, more preferably 5 mass % or greater, and even more preferably 10 mass % or greater. This enables the dispersion to exhibit superior coloring properties as an ink, and also reduces the amount of solvent, thus enhancing the drying properties.

On the other hand, the amount of the colored resin particles relative to the total mass of the dispersion is preferably not more than 50 mass %, and is more preferably 40 mass % or less, and even more preferably 30 mass % or less. This enables the dispersibility and storage stability to be enhanced.

(Method of Producing Colored Resin Particle Dispersion)

Examples of the method of producing the colored resin particle dispersion of the present embodiment are described below. However, the colored resin particle dispersion according to the present embodiment is not limited to dispersions produced using the following production methods.

Methods of preparing the colored resin particle dispersion can be broadly classified into chemical methods and physicochemical methods. Examples of the chemical methods include interfacial polycondensation methods, interfacial reaction methods (in situ polymerization methods), and in-liquid cured coating methods (orifice methods). Examples of the physicochemical methods include in-liquid drying methods (in-water drying methods and in-oil drying methods), coacervation methods, and fusion dispersion cooling methods.

The colored resin particle dispersion according to the present embodiment can be prepared, for example, using one of the physicochemical methods mentioned above. In-liquid drying methods can be used favorably, and an in-oil drying method of an oil-in-oil emulsion can be used particularly favorably.

By using an in-oil drying method of an oil-in-oil emulsion, the materials described above can be used to prepare colored resin particles having a small average particle size and a narrow particle size distribution, and a colored resin particle dispersion having a low viscosity can also be prepared. As a result, an ink that is particularly suited to inkjet discharge can be obtained, and an inkjet ink having excellent rub fastness can be obtained.

A colored resin particle dispersion produced using an in-oil drying method of an oil-in-oil emulsion can be obtained using a phase containing at least the basic dispersant and a non-aqueous solvent (hereafter the non-aqueous solvent of the continuous phase is sometimes referred to as "solvent A") as the continuous phase, and a phase containing at least the colorant, the solid resin, the crosslinking agent and a non-aqueous solvent (hereafter the non-aqueous solvent of the dispersed phase is sometimes referred to as "solvent B") as the dispersed phase, by dispersing the dispersed phase in the continuous phase to prepare an oil-in-oil (O/O) emulsion, and then removing the solvent B of the dispersed phase from the emulsion.

In order to ensure stable preparation of the oil-in-oil emulsion, the solvent B preferably exhibits low solubility in the solvent A. Further, in order to enable removal of the solvent B, the solvent B preferably has a lower boiling point than that of the solvent A.

In order to ensure stable preparation of the oil-in-oil emulsion, the basic dispersant preferably has a higher solubility in the solvent A than in the solvent B. Further, in order to stabilize the shape of the colored resin particles, the solid resin preferably has a higher solubility in the solvent B than in the solvent A.

The solid resin preferably has functional groups that can react with the crosslinking agent. The crosslinking agent preferably has a functional group that can react with the functional groups of the solid resin.

Continuous Phase

The continuous phase contains the solvent A and the basic dispersant.

The solvent A may be selected appropriately from all manner of non-aqueous solvents, so as to satisfy the relationships described below with an acidic dispersant, the solvent B and the solid resin.

Both non-polar organic solvents and polar organic solvents can be used as the non-aqueous solvent. These solvents may be used individually, or combinations of two or more solvents may be used, provided they form a single phase.

Examples of preferred non-polar organic solvents include petroleum-based hydrocarbon solvents such as aliphatic hydrocarbon solvents, alicyclic hydrocarbon solvents and aromatic hydrocarbon solvents. Examples of the aliphatic hydrocarbon solvents and alicyclic hydrocarbon solvents include paraffin-based, isoparaffin-based, and naphthene-based solvents. Specific examples include the solvents marketed under the product names listed below, including Teclean N-16, Teclean N-20, Teclean N-22, Naphtesol L, Naphtesol M, Naphtesol H, No. 0 Solvent L, No. 0 Solvent M, No. 0 Solvent H, Isosol 300, Isosol 400, AF Solvent No. 4, AF Solvent No. 5, AF Solvent No. 6, AF Solvent No. 7, and Cactus Normal Paraffin N12, N13, N14, YHNP and SHNP (all manufactured by JX Nippon Oil & Energy Corporation); and Isopar G, Isopar H, Isopar L, Isopar M, Exxsol D40, Exxsol D80, Exxsol D100, Exxsol D130 and Exxsol D140 (all manufactured by TonenGeneral Sekiyu K.K.). Examples of aromatic hydrocarbon solvents include Grade Alkene L and Grade Alkene 200P (both manufactured by JX Nippon Oil & Energy Corporation), and Solvesso 200 (manufactured by TonenGeneral Sekiyu K.K.). The 50% distillation point of the non-polar organic solvent is preferably at least 100° C., more preferably 150° C. or higher, and even more preferably 200° C. or higher. The 50% distillation point is measured in accordance with JIS K0066 "Test Methods for Distillation of Chemical Products", and represents the temperature at which 50% of the mass of the solvent has volatilized.

Among polar organic solvents, examples of preferred water-insoluble polar organic solvents include ester-based solvents, higher alcohol-based solvents and higher fatty acid-based solvents. Specific examples include ester-based solvents having a carbon number of 14 or higher within each molecule, such as methyl laurate, isopropyl laurate, isopropyl myristate, isopropyl palmitate, isostearyl palmitate, methyl oleate, ethyl oleate, isopropyl oleate, butyl oleate, methyl linoleate, isobutyl linoleate, ethyl linoleate, isopropyl isostearate, methyl soybean oil, isobutyl soybean oil, methyl tallate, isobutyl tallate, diisopropyl adipate, diisopropyl sebacate, diethyl sebacate, propylene glycol monocaprate, trimethylolpropane tri-2-ethylhexanoate and glyceryl tri-2-ethylhexanoate; higher alcohol-based solvents having a carbon number of 8 or higher within each molecule, such as isomyristyl alcohol, isopalmityl alcohol, isostearyl alcohol and oleyl alcohol; and higher fatty acid-based solvents having a carbon number of 9 or higher within each molecule, such as isononanoic acid, isomyristic acid, hexadecanoic acid, isopalmitic acid, oleic acid and isostearic acid.

These solvents may be used individually, or a plurality of solvents may be combined.

Among these solvents, the solvent A is preferably a non-polar organic solvent, and is more preferably a naphthene-based, paraffin-based or isoparaffin-based hydrocarbon solvent.

The solvent A preferably has a Hansen solubility parameter (HSP value) of 14 to 18 MPa/cm$^3$. Further, the solvent A preferably has a dispersion parameter $\delta d$ of 12 to 20, a polar parameter $\delta p$ of 0 to 4, and a hydrogen bonding parameter $\delta h$ of 0 to 4.

By ensuring that the solubility parameters of the solvent A satisfy the above ranges, and that that the solubility parameters of the acidic compound and the solid resin of the colored resin particles satisfy the ranges described above, the dispersion stability of the colored resin particles in the solvent A can be improved. Further, when printing is performed using the colored resin particle dispersion, separation of the colored resin particles and the non-aqueous solvent on the paper can be accelerated, thereby enhancing the fixability of the colored resin particles to the paper and improving the abrasion resistance. This type of fixability effect manifests particularly strongly when printing to relatively impermeable papers such as coated papers.

In terms of the combination of the solid resin and the solvent A, the $\Delta$HSP value described below is preferably within a range from 14 to 25.

$$\Delta HSP^2 = (\delta d_{solid\ resin} - \delta d_{solvent\ A})^2 + (\delta p_{solid\ resin} - \delta p_{solvent\ A})^2 + (\delta h_{solid\ resin} - \delta h_{solvent\ A})^2$$

Similarly, in terms of the combination of the acidic compound and the solvent A, the $\Delta$HSP value described below is preferably within a range from 14 to 25.

$$\Delta HSP^2 = (\delta d_{acidic\ compound} - \delta d_{solvent\ A})^2 + (\delta p_{acidic\ compound} - \delta p_{solvent\ A})^2 + (\delta h_{acidic\ compound} - \delta h_{solvent\ A})^2$$

By ensuring that these $\Delta$HSP values satisfy the above ranges, the dispersion stability of the colored resin particles in the solvent A can be further improved, and the separation of the colored resin particles and the non-aqueous solvent on paper can be accelerated, thereby further improving the fixability to the paper.

The 50% distillation point of the solvent A is preferably not higher than 400° C., and is more preferably 300° C. or lower. On the other hand, in order to prevent volatilization of the solvent A and maintain the stability of the colored resin particle dispersion, the lower limit for the 50% distillation point of the solvent A is preferably at least 100° C., and more preferably 150° C. or higher.

The basic dispersant is a dispersant having a basic group. The basic dispersant preferably has a higher solubility in the solvent A than in the solvent B.

The solubility of the basic dispersant in the solvent B at 23° C. is preferably not more than 3 g/100 g, and more preferably 0.5 g/100 g or less. Further, the solubility of the basic dispersant in the solvent A at 23° C. is preferably at least 3 g/100 g, and more preferably 5 g/100 g or greater. It is even more preferable that the basic dispersant is selected so that, in the blend proportions used in the oil-in-oil emulsion, the basic dispersant dissolves essentially completely in the solvent A, and undergoes essentially no dissolution in the solvent B.

The basic dispersant is preferably a compound for which, when the basic dispersant is dissolved in a non-aqueous solvent, the oxidation-reduction potential (ORP value) decreases as the concentration of the basic dispersant increases.

For example, when the basic dispersant is dissolved in a solvent capable of dissolving the basic dispersant, it is preferable that the ORP value when the basic dispersant is dissolved in an amount of 5.0 mass % is lower than the ORP value when the basic dispersant is dissolved in an amount of 0.5 mass %.

Further, the ORP value when the basic dispersant is dissolved in dodecane in an amount of 5.0 mass % is preferably not higher than 0 mV.

On the other hand, if the basic dispersant includes an acidic group as well as the basic group, then the compound can still be used favorably as the basic dispersant, despite containing an acidic group, provided the ORP value exhibits this tendency to decrease. It is preferable that the basic dispersant does not contain an acidic group.

Examples of the basic group of the basic dispersant include an amino group, amide group and pyridyl group, and among these, an amino group is preferable. Further, other examples of the basic group of the basic dispersant include nitrogen-containing functional groups having a urethane linkage or the like. Furthermore, nitrogen-containing structural units such as a urethane linkage may be introduced into the basic dispersant.

Examples of the basic dispersant include modified polyurethanes, basic group-containing poly(meth)acrylates, basic group-containing polyesters, polyesteramines, quaternary ammonium salts, alkylamine salts such as stearylamine acetate, and fatty acid amine salts. These compounds may be used individually, or a plurality of compounds may be combined.

Examples of commercially available basic dispersants include "Solsperse 13940 (a polyester amine-based dispersant), 17000 and 18000 (fatty acid amine-based dispersants), and 11200, 22000, 24000 and 28000" (all product names), manufactured by Lubrizol Japan Ltd., "DISPERBYK-116, 2096 and 2163" (all product names), manufactured by BYK-Chemie Japan K.K., "ACETAMIN 24 and 86 (alkylamine salt-based dispersants)" (both product names), manufactured by Kao Corporation, and "DISPARLON KS-860 and KS-873N4 (high-molecular weight polyester amine salts) (both product names), manufactured by Kusumoto Chemicals, Ltd.

The basic dispersant preferably has a base value. The base value of the basic dispersant is preferably at least 1 mgKOH/g, more preferably 10 mgKOH/g or higher, and even more preferably 15 mgKOH/g or higher. This ensures that a fine and stable colored resin particle dispersion can be prepared.

Here, the base value describes the number of milligrams of potassium hydroxide equivalent to the amount of hydrochloric acid needed to neutralize all of the basic components contained within 1 g of the non-volatile fraction of the compound. This definition also applies below.

The basic dispersant preferably contains a (meth)acrylic block polymer having basic groups. Here, the term "(meth) acrylic block polymer" means both methacrylic block polymers and acrylic block polymers, and includes homopolymers containing only methacrylic units or acrylic units, and copolymers containing both methacrylic units and acrylic units.

By using a (meth)acrylic block polymer having basic groups as the basic dispersant, the viscosity of the colored resin particle dispersion can be suppressed to a low level, and the average particle size of the colored resin particles can be kept small. As a result, an ink that is particularly suited to inkjet discharge can be obtained.

One example of a preferred (meth)acrylic block polymer having basic groups is a block copolymer having a first block containing units having an alkyl group with a carbon number of 12 or greater, and a second block containing units having an amino group.

With this block copolymer, because the alkyl group portions exhibit good solvent affinity and the amino group portions exhibit good affinity with the colored resin particles, the dispersibility of the colored resin particles can be enhanced. Further, the emulsion stability when preparing the oil-in-oil emulsion can also be enhanced. Because of the block copolymer structure, the alkyl group portions are localized, the alkyl group portions are readily orientated on the solvent side, and the solvent affinity can be further enhanced.

The alkyl group with a carbon number of 12 or greater may be either a linear or branched alkyl group, and specific examples include a dodecyl group, cetyl group, stearyl group, behenyl group, isododecyl group and isostearyl group.

These alkyl groups with a carbon number of 12 or greater may be incorporated in the first block either individually, or in combinations of two or more different groups.

Examples of groups that can be used as the amino group include groups represented by general formula $-NR^1R^2$, wherein each of $R^1$ and $R^2$ independently represents a hydrogen atom, a hydrocarbon group having a carbon number of 18 or less, or an alkanol group having a carbon number of 8 or less.

Examples of the hydrocarbon groups having a carbon number of 18 or less include chain-like hydrocarbon groups such as a methyl group, ethyl group, propyl group and butyl group, and cyclic hydrocarbon groups such as a cyclohexyl group and phenyl group. Examples of the alkanol group having a carbon number of 8 or less include an ethanol group and an isopropanol group.

The amino group is preferably a dialkanolamino group represented by general formula $-N(HOR)_2$ (wherein R represents a divalent hydrocarbon group).

The molar ratio between the first block and the second block is preferably from 20:80 to 90:10, and more preferably from 30:70 to 70:30.

The first and second blocks may each contain other groups besides the alkyl group with a carbon number of 12 or more and the amino group respectively. Examples of these other groups include alkyl groups having a carbon number of less than 12, and a benzyl group and the like.

One example of a preferred (meth)acrylic polymer having basic groups is a block copolymer having a block A of a monomer mixture a containing an alkyl (meth)acrylate (A) having an alkyl group with a carbon number of 12 or greater (hereafter also referred to as "monomer (A)"), and a block B of a monomer mixture b containing a reactive (meth)acrylate (B) having a functional group that can react with an amino group (hereafter also referred to as "monomer (B)") (hereafter this block copolymer is also referred to as simply a "(meth)acrylic block polymer"), wherein the functional group that can react with an amino group is reacted with an amino alcohol to introduce an amino group. Hereafter this block copolymer is sometimes referred to as simply an "amine-modified (meth)acrylic block polymer".

In this amine-modified (meth)acrylic block polymer, the introduced amino alcohol portions function as oil-in-oil emulsion interface adsorption groups, and also as adsorption groups for the colored resin particles, whereas the alkyl groups with a carbon number of 12 or greater exhibit good solvent affinity, and can enhance the emulsion stability of the oil-in-oil emulsion and the dispersibility of the colored resin particles.

Examples of the alkyl (meth)acrylate (A) having an alkyl group with a carbon number of 12 or greater include dodecyl (meth)acrylate, cetyl (meth)acrylate, stearyl (meth)acrylate, behenyl (meth)acrylate, isododecyl (meth)acrylate, and isostearyl (meth)acrylate. A plurality of these compounds may also be included. The carbon number of the alkyl group is preferably from 12 to 25.

Preferred examples of the functional group that can react with an amino group in the reactive (meth)acrylate (B) include a glycidyl group, vinyl group, and (meth)acryloyl group. An example of the monomer (B) having a glycidyl group is glycidyl (meth)acrylate, and examples of the monomer (B) having a vinyl group include vinyl (meth)acrylate and 2-(2-vinyloxyethoxy)ethyl (meth)acrylate. Examples of the monomer (B) having a (meth)acryloyl group include dipropylene glycol di(meth)acrylate and 1,6-hexanediol di(meth)acrylate. A plurality of these compounds may also be included.

The monomer mixtures a and b may each include a copolymerizable monomer (C) other than the aforementioned monomer (A) or (B) respectively, provided that the effects of the present invention are not impaired.

Examples of this monomer (C) include styrene-based monomers such as styrene and α-methylstyrene; vinyl ether-based monomers such as vinyl acetate, vinyl benzoate and butyl vinyl ether; as well as maleate esters, fumarate esters, acrylonitrile, methacrylonitrile and α-olefins. Further, alkyl (meth)acrylates in which the alkyl chain length has a carbon number of less than 12, such as 2-ethylhexyl (meth)acrylate, isooctyl (meth)acrylate and tert-octyl (meth)acrylate can also be used. Furthermore, (meth)acrylates having a β-diketone group or a β-keto acid ester group, including acetoacetoxyalkyl (meth)acrylates such as 2-acetoacetoxyethyl (meth)acrylate, hexadione (meth)acrylate, and acetoacetoxyalkyl (meth)acrylamides such as acetoacetoxyethyl (meth)acrylamide can also be used. These monomers may be used individually, or a combination of two or more monomers may be used.

Examples of the amino alcohol include monomethylethanolamine, diethanolamine and diisopropanolamine. Among the various possibilities, from the viewpoint of providing two hydroxyl groups and thereby promoting the adsorption of the compound to the interface of the oil-in-oil emulsion, a dialkanolamine (secondary alkanolamine) represented by general formula $(HOR)_2NH$ (wherein R represents a divalent hydrocarbon group) is preferable. A combination of a plurality of these amino alcohols may also be used.

In order to enable the introduction of amino groups and ensure satisfactory dispersion of the colored resin particles, this amino alcohol is preferably reacted in an amount within a range from 0.05 to 1 molar equivalent, and more preferably from 0.5 to 1 molar equivalent, relative to the functional group that can react with an amino group in the aforementioned monomer (B). An amount of the amino alcohol of less than 1 molar equivalent means some unreacted functional groups will remain within the monomer (B), but it is thought that these residual functional groups function as adsorption groups for the colored resin particles.

In one example of a method of synthesizing the amine-modified (meth)acrylic block polymer, in a first stage, one of the monomer mixture a containing the monomer (A) and the monomer mixture b containing the monomer (B) is polymerized to obtain a first block, in a second stage, the other monomer mixture is polymerized in the presence of this first block, thereby linking a block of the other monomer mixture to the terminal of the first block and yielding a polymerized (meth)acrylic block polymer, and in a subsequent third stage, diethanolamine is reacted with this (meth)acrylic block polymer to obtain the amine-modified (meth)acrylic block polymer.

There are no particular limitations on the molecular weight (weight-average molecular weight) of the amine-modified (meth)acrylic block polymer, but in the case of use as an inkjet ink, from the viewpoint of the discharge properties of the ink, the molecular weight is preferably about 10,000 to 100,000, and more preferably about 10,000 to 80,000. Moreover, in the dispersant of the present embodiment, a molecular weight of about 20,000 to 50,000 enables excellent dispersion stability to be obtained.

The molecular weight of this amine-modified (meth)acrylic block polymer is substantially the same as the molecular weight of the (meth)acrylic block polymer prior to reaction with the amino alcohol, and therefore by adjusting the molecular weight in the polymerization process for the (meth)acrylic block polymer, an amine-modified (meth)acrylic block polymer having a molecular weight within the desired range can be obtained.

Within the amine-modified (meth)acrylic block polymer, the weight-average molecular weight of the block A portion polymerized from the monomer mixture a containing the monomer (A) is preferably about 5,000 to 40,000, and more preferably about 8,000 to 30,000. This ensures that the solvent affinity of the block A portion falls within a more suitable range.

Another example of the (meth)acrylic block polymer having basic groups is a block copolymer having a block A of a monomer mixture a containing an alkyl (meth)acrylate (A) having an alkyl group with a carbon number of 12 or greater, and a block B of a monomer mixture b containing a reactive (meth)acrylate (B) having an amino group.

In this example, (meth)acrylates having a tertiary amino group can be used favorably as the (meth)acrylate (B) having an amino group. Specifically, dimethylaminoethyl (meth)acrylate, diethylaminoethyl (meth)acrylate, dimethylaminopropyl methacrylamide, or dipropylaminoethyl (meth)acrylamide or the like may be used individually, or in combinations containing a plurality of these compounds.

This (meth)acrylic block polymer having basic groups can be obtained by a method in which, in a first stage, one of the monomer mixture a containing the monomer (A) and the monomer mixture b containing the monomer (B) having an amino group is polymerized to obtain a first block, and in a second stage, the other monomer mixture is polymerized in the presence of this first block, thereby linking a block of the other monomer mixture to the terminal of the first block.

From the viewpoints of the stability of the emulsion and the dispersibility of the colored resin particles, the amount of the basic dispersant within the continuous phase is preferably from 0.1 to 15 mass %, and more preferably from 1 to 10 mass %, relative to the total mass of the continuous phase.

From the viewpoint of the dispersibility of the colored resin particles, the amount of the basic dispersant following removal of the solvent B is preferably from 0.1 to 20 mass %, and more preferably from 1 to 15 mass %, relative to the total mass of the colored resin particle dispersion.

Other optional components such as antioxidants, surface tension regulators and antifoaming agents may be added to the continuous phase, provided they do not impair the effects of the present invention.

Dispersed Phase

The dispersed phase contains the solvent B, the solid resin and the crosslinking agent. Further, the dispersed phase may also contain an acidic compound.

The solubility of the solvent B in the aforementioned solvent A at 23° C. is preferably not more than 3 g/100 g, and the boiling point of the solvent B is preferably lower than that of the solvent A.

The solvent B is preferably a polar organic solvent, and is more preferably a lower alcohol-based solvent. Examples of this lower alcohol-based solvent include isopropyl alcohol, ethylene glycol, ethanol, methanol, propanol and butanol. Lower alcohol-based solvents having a carbon number of 4 or less are particularly preferable.

Other specific examples of the solvent B include acetone, methyl ethyl ketone, and ethyl acetate and the like. Moreover, the solvent B may be selected appropriately so as to satisfy specific relationships with the aforementioned solvent A, the basic dispersant and the solid resin.

These solvents may be used individually, or a plurality of solvents may be combined.

The solubility of the solvent B in the solvent A at 23° C. is preferably not more than 3 g/100 g, and is more preferably 1 g/100 g or less, and even more preferably 0.5 g/100 g or less. It is even more preferable that the solvent B is essentially insoluble in the solvent A.

The difference in the boiling points of the solvent B and the solvent A is preferably at least 10° C., more preferably 20° C. or greater, and even more preferably 50° C. or greater. In the case of a mixed solvent such as a petroleum-based hydrocarbon solvent, the 50% distillation point is used as the boiling point. Further, the boiling point of the solvent B is preferably not higher than 100° C., and is more preferably 90° C. or lower. On the other hand, there are no particular limitations on the lower limit for the boiling point of the solvent B, provided the solvent B is liquid within a range from −20 to 90° C.

The solvent B preferably has a Hansen solubility parameter (HSP value) of 18 to 30 $MPa/cm^3$, and more preferably 20 to 30 $MPa/cm^3$. Further, the solvent B preferably has a dispersion parameter $\delta d$ of 14 to 17, a polar parameter $\delta p$ of 5 to 15, and a hydrogen bonding parameter $\delta h$ of 5 to 25, and more preferably has a dispersion parameter $\delta d$ of 14 to 17, a polar parameter $\delta p$ of 5 to 15, and a hydrogen bonding parameter $\delta h$ of 15 to 25.

By ensuring that the solubility parameters of the solvent B satisfy the above ranges, the solubility in the solvent A can be kept low, and the solvent can be provided with the ability to dissolve both the colored resin particles and the solid resin. Provided the solubility parameters of the colored resin particles and the solid resin satisfy the ranges described above, they will dissolve in the solvent B but be insoluble in the solvent A, meaning good dispersion stability can be obtained.

Further, it is preferable that the solvent A is a hydrocarbon-based solvent, and the solvent B is an alcohol-based solvent having a carbon number of 4 or less. Preferred examples of the hydrocarbon-based solvent include naphthene, paraffin, and isoparaffin and the like, whereas preferred examples of the alcohol-based solvent having a carbon number of 4 or less include methanol, ethanol, propanol and butanol, with methanol being particularly preferable.

The colorant may be a dye or a pigment, or a combination thereof.

In the present embodiment, by forming the colored resin particles, the colorant is encapsulated by the crosslinked resin, and therefore the abrasion resistance of the printed items can be enhanced. As a result of the crosslinked resin, resin film formation on the pigment can also be enhanced.

The solubility of the colorant in the solvent A at 23° C. is preferably not more than 3 g/100 g, and is more preferably 1 g/100 g or less, and even more preferably 0.5 g/100 g or less. It is even more preferable that the colorant is selected so that, in the blend proportions used in the oil-in-oil emulsion, the colorant is essentially insoluble in the solvent A.

Organic pigments such as azo pigments, phthalocyanine pigments, polycyclic pigments and dye lake pigments, and inorganic pigments such as carbon blacks and metal oxides can be used as the pigment. Examples of the azo pigments include soluble azo lake pigments, insoluble azo pigments and condensed azo pigments. Examples of the phthalocyanine pigments include metal phthalocyanine pigments and metal-free phthalocyanine pigments. Examples of the polycyclic pigments include quinacridone-based pigments, perylene-based pigments, perinone-based pigments, isoindoline-based pigments, isoindolinone-based pigments, dioxazine-based pigments, thioindigo-based pigments, anthraquinone-based pigments, quinophthalone-based pigments, metal complex pigments and diketopyrrolopyrrole (DPP). Examples of the carbon blacks include furnace carbon black, lamp black, acetylene black and channel black. Examples of the metal oxides include titanium oxide and zinc oxide. These pigments may be used individually, or a combination of two or more pigments may be used.

The average particle size of the pigment is preferably 300 nm or less, and more preferably 200 nm or less. This ensures that the dispersibility of the pigment within the dispersed phase can be maintained favorably, and also ensures that the particle size of the final colored resin particles is appropriate.

When a pigment is used for the colorant, solid chips having the pigment already dispersed in the aforementioned solid resin can be used. In such a case, the affinity between the pigment and the resin is improved, and the fixability can be further enhanced. Further, such solid chips are also advantageous from the viewpoint of ink production. Examples of the method used for dispersing the pigment in the solid resin include a method using a twin roll mill or the like.

Examples of commercially available solid chips that can be used include those listed below. All of the following products are manufactured by Taihei Chemicals Limited, and use nitrocellulose (NC) as the solid resin.

"NCL1/4 Mogul L": carbon black (45%)/NCL1/4 (45%)/ATBC (10%)

"NCL1/8 Yellow FGS": pigment yellow 74 (50%)/NCL1/8 (35%)/ATBC (15%)

"NCL1/4 Blue B4G": phthalocyanine blue (40%)/NCL1/4 (45%)/ATBC (15%)

NCL1/4 and NCL1/8 are nitrocellulose, and ATBC is acetyl tributyl citrate. The above % values are mass % values.

When a pigment is used for the colorant, in order to ensure stable dispersion of the pigment within the dispersed phase, namely within the solvent B, a pigment dispersant may be included in the dispersed phase.

An anionic dispersant, cationic dispersant or nonionic dispersant may be used as the pigment dispersant, and the dispersant may be selected appropriately in accordance with the other components of the emulsion. Further, the pigment dispersant may use a high-molecular weight compound or a low-molecular weight compound (surfactant).

Examples of the pigment dispersant include hydroxyl group-containing carboxylate esters, salts of high-molecular weight polycarboxylic acids, naphthalenesulfonic acid formalin condensate salts, polyoxyethylene alkyl phosphate esters, salts of long-chain polyaminoamides and high-molecular weight acid esters, salts of long-chain polyaminoamides and polar acid esters, polyester polyamines, stearylamine acetate, high-molecular weight unsaturated acid esters, polyoxyethylene nonylphenyl ethers, high-molecular weight copolymers, modified polyurethanes, and modified polyacrylates and the like.

These dispersants may be used individually, or a plurality of dispersants may be combined.

The pigment dispersant preferably has a higher solubility in the solvent B than in the solvent A, and for example the solubility in the solvent B at 23° C. is preferably at least 3 g/100 g, and more preferably 5 g/100 g or greater. It is even more preferable that the pigment dispersant is selected so that, in the blend proportions used in the oil-in-oil emulsion, the pigment dispersant dissolves essentially completely in the solvent B, and undergoes essentially no dissolution in the solvent A.

A compound that exhibits pigment dispersion properties, selected from among the acidic compounds described above, may be used as the anionic dispersant.

Examples of commercially available products that can be used as the acidic compound used as the anionic dispersant include "DISPERBYK 102, 108, 110, 111, 180" (all product names) manufactured by BYK-Chemie Japan K.K., "TEGO Dispers 655" manufactured by Tomoe Engineering Co., Ltd., and "Efka 6230" manufactured by Efka Chemicals B.V. All of these products exhibit good solubility in the solvent B.

For the cationic dispersant, nitrogen-containing compounds having an amino group, amide group, pyridyl group, or urethane linkage or the like can be used favorably, and among such compounds, nitrogen-containing compounds having an amino group are preferable.

Examples of commercially available products that can be used as the cationic dispersant include "Solsperse 71000" manufactured by The Lubrizol Corporation, and "DISPERBYK 2155 and 9077" manufactured by BYK-Chemie Japan K.K. All of these products exhibit good solubility in the solvent B.

When a cationic dispersant is used as the pigment dispersant, the base value of the cationic dispersant is preferably at least 1 mgKOH/g, more preferably 10 mgKOH/g or greater, and even more preferably 20 mgKOH/g or greater. This enhances the affinity with the pigment, and can improve the dispersion performance.

The blend amount of the pigment dispersant within the dispersed phase can be set as appropriate, but from the viewpoint of the pigment dispersibility, the mass ratio relative to 1 part of the pigment is preferably about 0.05 to 2.0 parts, more preferably from 0.1 to 1.0 parts, and even more preferably from 0.2 to 0.6 parts.

Any of the dyes typically used in this technical field can be used, and examples include basic dyes, acid dyes, direct dyes, soluble vat dyes, acid mordant dyes, mordant dyes, reactive dyes, vat dyes, sulfide dyes, metal complex dyes and salt-forming dyes. These dyes may be used individually, or a plurality of dyes may be combined.

Specific examples of the dyes include azo dyes, metal complex dyes, naphthol dyes, anthraquinone dyes, indigo dyes, carbonium dyes, quinoneimine dyes, xanthene dyes, cyanine dyes, quinoline dyes, nitro dyes, nitroso dyes, benzoquinone dyes, naphthoquinone dyes, phthalocyanine-based dyes, metal phthalocyanine-based dyes, triarylmethane dyes, rhodamine dyes, sulforhodamine dyes, methine dyes, azomethine dyes, quinone dyes, triphenylmethane dyes, diphenylmethane dyes, and methylene blue and the like. These dyes may be used individually, or a plurality of dyes may be combined.

In a preferred configuration, by ensuring that the dye has a higher solubility in the solvent B than in the solvent A, the dye and the resin can be dissolved in the solvent B in the dispersed phase, enabling a stable colored resin particle dispersion to be provided.

The solubility of the dye in the solvent A at 23° C. is preferably not more than 0.5 g/100 g, and more preferably 0.1 g/100 g or less. Further, the solubility of the dye in the solvent B at 23° C. is preferably at least 0.5 g/100 g, and more preferably 1 g/100 g or greater. It is even more preferable that the dye is selected so that, in the blend proportions used in the oil-in-oil emulsion, the dye dissolves essentially completely in the solvent B, and undergoes essentially no dissolution in the solvent A.

Further, from the viewpoint of the water resistance of the colored resin particles, the dye is preferably an oil-soluble dye. Further, by using an acid dye, the basic dispersant is incorporated in the continuous phase and the acidic acid dye is incorporated in the dispersed phase, and therefore the oil-in-oil dispersion can be better stabilized. A metal complex dye is particularly preferable.

Examples of these types of oil-soluble dyes include the "Oil Color series" and the "VALDAST Color series" manufactured by Orient Chemical Industries Co., Ltd.

Specific examples of metal complex dyes that can be used include the "VALIFAST Color series" manufactured by Orient Chemical Industries Co., Ltd., including Valifast Black 3804, 3810 (solvent black 29), 3820, 3830, 3840 (solvent black 27) and 3870, Valifast Blue 1605, 2606, 2620 and 2670, Valifast Orange 3209 and 3210, Valifast Pink 2310N and 2312, Valifast Red 3304, 3311, 3312 and 3320, and Valifast Yellow 3108, 3170, 4120 and 4121;

the "Orasol series" manufactured by BASF Corporation, including Orasol Black RL1, Blue GN, Pink 5BLG and Yellow 2RLN; and the "Aizen Spilon series" manufactured by Hodogaya Chemical Co., Ltd., including Aizen Spilon Black BH and RLH, Aizen Spilon Violet RH, Aizen Spilon Red CBH and BEH, Aizen Spilon Yellow GRH, Aizen SPT Blue 26, Aizen SPT Blue 121, and Aizen SPN Yellow 510.

The amount of the colorant in the dispersed phase, reported as a combined amount of the pigments and dyes relative to the total mass of the dispersed phase, is preferably from 0.1 to 50 mass %, more preferably from 1 to 40 mass %, and even more preferably from 2 to 20 mass %. This enables the solubility or dispersibility of the colorant in the solvent B to be stabilized.

Following removal of the solvent B, the amount of the colorant, reported as a combined amount of the pigments and dyes relative to the total mass of the colored resin particle dispersion, is preferably from 0.1 to 50 mass %, more preferably from 1 to 40 mass %, and even more preferably from 2 to 20 mass %. This ensures that the coloring of the colored resin particles is appropriate, and that the shape of the particles can be stabilized.

The solid resin is preferably a resin that is solid at room temperature (23° C.). Details are as described above.

When the colored resin particles are produced via an oil-in-oil emulsion, it is preferable that this solid resin has a higher solubility in the solvent B than in the solvent A.

The solubility of the solid resin in the solvent B at 23° C. is preferably at least 10 g/100 g, and more preferably 20 g/100 g or greater. Further, the solubility of the solid resin in the solvent A at 23° C. is preferably not more than 3 g/100 g, and more preferably 0.5 g/100 g or less. It is even more preferable that, in the blend proportions used in the oil-in-oil emulsion, the resin dissolves essentially completely in the solvent B, and undergoes essentially no dissolution in the solvent A.

Further, when a pigment is used for the colorant, by using a solid resin that has pigment dispersion properties, the dispersibility of the pigment can be enhanced. A resin having basic groups can be used as this type of solid resin that has pigment dispersion properties, and specific examples of resins that can be used include nitrogen-containing resins such as nitrocellulose and methoxymethylated nylon.

The amount of the solid resin relative to the total mass of the dispersed phase is preferably from 0.1 to 50 mass %, more preferably from 1 to 40 mass %, and even more preferably from 2 to 20 mass %. This enables appropriate solubility of the resin within the solvent B, and enables a more even distribution of the components of the colored resin particles.

The amount of the solid resin relative to the total mass of the colored resin particle dispersion following removal of the solvent B is preferably from 0.1 to 20 mass %, and more preferably from 1 to 15 mass %. This ensures that the coloring of the colored resin particles is appropriate, and that the shape of the particles can be stabilized.

The mass ratio between the solid resin and the colorant preferably satisfies (mass of solid resin)/(mass of colorant) ≥0.5. When this range is satisfied, mixing and stirring of the continuous phase and the dispersed phase is able to provide an oil-in-oil emulsion having excellent emulsion stability.

The crosslinking agent is preferably a compound which exhibits crosslinking reactivity with the aforementioned solid resin. Details are as described above.

When the colored resin particle dispersion is produced via an oil-in-oil emulsion, it is preferable that this crosslinking agent has a higher solubility in the solvent B than in the solvent A.

The solubility of the crosslinking agent in the solvent B at 23° C. is preferably at least 10 g/100 g, and more preferably 20 g/100 g or greater. Further, the solubility of the crosslinking agent in the solvent A at 23° C. is preferably not more than 3 g/100 g, and more preferably 0.5 g/100 g or less. It is even more preferable that, in the blend proportions used in the oil-in-oil emulsion, the crosslinking agent dissolves essentially completely in the solvent B, and undergoes essentially no dissolution in the solvent A.

The amount of the crosslinking agent relative to the total mass of the dispersed phase is preferably from 1 to 50 mass %, more preferably from 3 to 40 mass %, and even more preferably from 5 to 30 mass %. This enables the crosslinking reaction of the solid resin to be accelerated, and also prevents excess crosslinking agent from being retained in the dispersion.

The amount of the crosslinking agent relative to the total mass of the colored resin particle dispersion following removal of the solvent B is preferably from 1 to 20 mass %, and more preferably from 5 to 15 mass %.

In addition to the components described above, an acidic compound may also be added to the dispersed phase. Details are as described above.

There are no particular limitations on the acidic compound, but the compound preferably has a higher solubility in the solvent B than in the solvent A. The solubility of the acidic compound in the solvent B at 23° C. is preferably at least 1 g/100 g, and more preferably 2 g/100 g or greater. Further, the solubility of the acidic compound in the solvent A at 23° C. is preferably not more than 3 g/100 g, and more preferably 0.5 g/100 g or less. It is even more preferable that, in the blend proportions used in the oil-in-oil emulsion, the acidic compound dissolves essentially completely in the solvent B, and undergoes essentially no dissolution in the solvent A.

The amount of the acidic compound relative to the total mass of the dispersed phase is preferably from 0.1 to 25 mass %, and more preferably from 1 to 20 mass %. This enables the emulsion to be better stabilized.

The amount of the acidic compound relative to the total mass of the colored resin particle dispersion following removal of the solvent B is preferably from 0.1 to 20 mass %, and more preferably from 1 to 15 mass %. This enables the abrasion resistance to be further enhanced.

The mass ratio between the acidic compound and the colorant preferably satisfies (mass of acidic compound)/(mass of colorant)≥0.5. When this range is satisfied, mixing and stirring of the continuous phase and the dispersed phase is able to provide an oil-in-oil emulsion having excellent emulsion stability.

Other optional components such as antifoaming agents, antioxidants and surface tension regulators may be added to the dispersed phase, provided they do not impair the effects of the present invention. An aforementioned plasticizer may also be added to the dispersed phase.

Method of Preparing Dispersion

The method used for preparing the colored resin particle dispersion is not particularly limited, and the dispersion can be prepared by dispersing the dispersed phase described above in the continuous phase described above to prepare an oil-in-oil emulsion, and then removing the non-aqueous solvent B from the dispersed phase of the oil-in-oil emulsion under reduced pressure and/or heating.

For example, the continuous phase and the dispersed phase can be prepared by mixing the various components described above. Subsequently, the dispersed phase can be dispersed in the continuous phase by mixing and stirring the two phases while the dispersed phase is added dropwise to the continuous phase. At this time, the mixing and stirring can be performed using an ultrasonic homogenizer. The non-aqueous solvent B is then removed from the obtained oil-in-oil emulsion under reduced pressure and/or heating. At this time, the degree of pressure reduction and/or heating is adjusted so that the non-aqueous solvent B is removed but the non-aqueous solvent A is retained.

When a pigment is used as the colorant, examples of the method used for dispersing the pigment in the dispersed phase include methods using typical wet dispersion devices such as a ball mill, beads mill, ultrasound, homomixer or high-pressure homogenizer.

In the process of preparing the dispersion, the crosslinking reaction between the solid resin and the crosslinking agent starts when the dispersed phase is prepared, but it is preferable that the dispersed phase and the continuous phase are mixed together before the fluidity decreases due to the crosslinking. The crosslinking may then proceed somewhat further during the emulsification of the dispersed phase and the continuous phase, and the preparation of the oil-in-oil emulsion. It is preferable that the crosslinking has completed once the non-aqueous solvent B is removed from the oil-in-oil emulsion.

In the dispersion following the removal of the non-aqueous solvent B, it is preferable that the crosslinking reaction between the solid resin and the crosslinking agent inside the colored resin particles has been completed, so that the solid resin exists in a crosslinked state.

The crosslinking reaction between the solid resin and the crosslinking agent is started by mixing the two components, but if necessary the rate of the crosslinking reaction may be altered by adjusting the temperature. For example, during preparation of the dispersed phase, cooling may be performed to restrict the crosslinking reaction, and then following preparation of the oil-in-oil emulsion, heating may be performed to accelerate the crosslinking reaction.

Further, the mass ratio between the continuous phase and the dispersed phase in the oil-in-oil emulsion can be adjusted within a range from 40:60 to 95:5, The amount added of the non-aqueous solvent B is preferably from 5 to 40 mass %, and more preferably from 5 to 30 mass %, relative to the total mass of the oil-in-oil emulsion. Further, the amount removed of the non-aqueous solvent B is preferably the total amount added of the non-aqueous solvent B, but any amount that is 90 mass % or more of the total amount added of the non-aqueous solvent B is acceptable.

Another example of the method used for producing the colored resin particle dispersion is a method in which the components of the dispersed phase are prepared independently as a plurality of mixed liquids, and these mixed liquids are then added dropwise, either simultaneously or sequentially, to the continuous phase to prepare the oil-in-oil emulsion.

Specifically, a method can be used in which a phase containing at least the basic dispersant and a non-aqueous solvent (the solvent A) is used as the continuous phase, a phase which does not contain the colorant or the solid resin, but contains at least the crosslinking agent and a non-aqueous solvent (the solvent B) is used as the dispersed phase, the continuous phase and the dispersed phase are mixed together to prepare an oil-in-oil (O/O) pre-emulsion, a mixed liquid containing the colorant, the solid resin and a non-aqueous solvent (the solvent B) is then added to this pre-emulsion to prepare an oil-in-oil (O/O) emulsion, and the solvent B from the dispersed phase and the added solvent B from the mixed liquid is then removed under reduced pressure and/or heating to obtain the colored resin particle dispersion. In the following description, this method is sometimes referred to as a two-stage emulsification method.

In order to ensure stable preparation of the oil-in-oil emulsion, the solvent B preferably exhibits low solubility in the solvent A. Further, in order to enable removal of the solvent B, the solvent B preferably has a lower boiling point than that of the solvent A.

In order to ensure stable preparation of the oil-in-oil emulsion, the basic dispersant preferably has a higher solubility in the solvent A than in the solvent B. Further, in order to stabilize the shape of the colored resin particles, the resin preferably has a higher solubility in the solvent B than in the solvent A.

In the two-stage emulsification method, aggregation of the colorant can be prevented in the process of preparing the colored resin particles, enabling finer colored resin particles to be provided. In the process for preparing the colored resin particles, the colorant may sometimes interact and aggregate with other components, but in this two-stage emulsification method, because the colorant is added afterward as an individual component, this type of aggregation can be prevented.

Colored resin particles of fine particle size are particularly suited to inkjet inks.

In the two-stage emulsification method, unless specifically mentioned otherwise, the various components used in the oil-in-oil emulsion are the same as those described above. The aggregation problem can be remedied regardless of whether the colorant is a pigment or a dye.

In the continuous phase, the blend amounts of the basic dispersant and the solvent A are the same as those used in the one-stage emulsification method described above.

In the dispersed phase, the amount of the crosslinking agent, relative to the total mass of the dispersed phase, is preferably from 3 to 40 mass %, and more preferably from 5 to 30 mass %.

The amount of the colorant in the mixed liquid, relative to the total mass of the mixed liquid, is preferably from 5 to 40 mass %, and more preferably from 10 to 30 mass %. When the colorant is a pigment, a pigment dispersant may also be added to the mixed liquid.

The amount of the solid resin in the mixed liquid, relative to the total mass of the mixed liquid, is preferably from 5 to 40 mass %, and more preferably from 10 to 30 mass %.

The dispersed phase may include an acidic compound in addition to the crosslinking agent and the solvent B. In such a case, the amount of the acidic compound in the dispersed phase, relative to the total mass of the dispersed phase, is preferably from 10 to 70 mass %, and more preferably from 10 to 50 mass %.

In the colored resin particle dispersion obtained by the two-step emulsification method, each of the components is preferably included in a prescribed proportion, in the same manner as described above for the one-step emulsification method.

In the colored resin particle dispersion, the average particle size of the colored resin particles is preferably the same as described above.

The average particle size of the colored resin particles can be controlled by adjusting the amount of the basic dispersant added to the continuous phase, or the amount of the non-volatile fraction included in the dispersed phase or the like. Because the solid resin is crosslinked by the crosslinking agent, the average particle size of the colored resin particles can be kept to a smaller size.

(Ink)

The ink according to the present embodiment is an ink containing the colored resin particle dispersion described above. This ink can be used as a general-purpose printing ink for inkjet printing, offset printing, stencil printing, or gravure printing or the like. Because the ink has good dispersion stability, use of the ink as an inkjet ink is particularly preferable.

When used as an inkjet ink, the colored resin particle dispersion can be used as is, but if required, may include any of the various additives typically used in the field, provided these additives do not impair the objects of the present invention. For example, nozzle blockage prevention agents, antioxidants, conductivity modifiers, viscosity modifiers, surface tension regulators, and oxygen absorbers and the like may be added as appropriate. There are no particular limitations on the types of these additives, and any additives used in the field can be used. Further, the colored resin particle dispersion may be diluted with a non-aqueous solvent described above.

The ideal range for the viscosity of the inkjet ink varies depending on factors such as the diameter of the nozzles within the discharge head of the inkjet recording system and the discharge environment, but generally, the viscosity at 23° C. is preferably within a range from 5 to 30 mPa·s, more preferably from 5 to 15 mPa·s, and most preferably about 10 mPa·s. In this description, the viscosity describes a value measured at 23° C. by raising the shear stress from 0 Pa at a rate of 0.1 Pa/s, and refers to the measured value at 10 Pa.

There are no particular limitations on the printing method using the inkjet ink, and any of various printing systems, including a piezo system, electrostatic system or thermal system may be used. In those cases where an inkjet recording device is used, the ink of the present embodiment is preferably discharged from the inkjet head based on a digital signal, with the discharged ink droplets being adhered to the recording medium.

In the present embodiment, there are no particular limitations on the recording medium, and examples of media that can be used include printing papers such as plain papers, coated papers and specialty papers, cloth, inorganic sheets, films and OHP sheets, and adhesive sheets having one of the above media as a base material and having an adhesive layer provided on the rear surface. Among these, from the viewpoint of ink penetration, a printing paper such as a plain paper or coated paper can be used particularly favorably.

Here, plain paper describes a normal paper in which an ink receiving layer or film layer or the like has not been formed on the surface of the paper. Examples of plain papers include high-quality papers, medium-quality papers, PPC papers, woody papers and recycled papers. In a plain paper, paper fibers with a thickness of several μm to several tens of μm are formed with a spacing between fibers of several tens to several hundred μm, and therefore the ink can penetrate readily.

Further, in terms of coated papers, coated papers designed for inkjets, and other so-called coated printing papers can be used favorably. A coated printing paper describes the type of paper that has conventionally been used in relief printing, offset printing, and gravure printing and the like, and is a printing paper in which a coating layer is formed on the surface of a high-quality paper or medium-quality paper using a coating material containing an inorganic pigment such as clay or calcium carbonate and a binder such as starch. Depending on the amount applied of the coating material and the coating method used, coated printing papers are classified into fine coated papers, high-quality lightweight coated papers, medium-quality lightweight coated papers, high-quality coated papers, medium-quality coated papers, art papers, and cast coated papers and the like. Coated printing papers have minimal gaps on the paper surface compared with plain papers and coated papers designed for inkjets, and therefore penetration of the ink is slow, and the ink components are more readily retained on the surface of the paper. As a result, the ink according to the present embodiment is suitable for improving the fixability to coated printing papers.

The present invention can provide a colored resin particle dispersion and an ink which provide excellent abrasion resistance of the printed items. Moreover, the invention also provides a colored resin particle dispersion and an inkjet ink which exhibit excellent abrasion resistance, water resistance and marker resistance, as well as favorable storage stability.

Examples

The present invention is described below in further detail using a series of examples, but the present invention is in no way limited by these examples. Unless specifically state otherwise, "%" refers to "mass %".

<Ink Preparation>

Formulations of oil-in-oil emulsions for a series of examples and comparative examples prior to removal of the solvent B are shown in Table 2 to Table 4. In each table, when a dispersant includes a volatile component, the total amount of the dispersant is shown, and the non-volatile fraction amount is also shown in parentheses (this also applies in Tables 5 to 7 below).

The continuous phase was prepared by mixing the solvent A and the basic dispersant in the blend amounts shown in each table. Subsequently, the dispersed phase was prepared by mixing the colorant and the solid resin with the solvent B in the blend amounts shown in each table, dispersing the resulting mixture using a beads mill, and then adding the crosslinking agent. In Examples 9 to 14, an acidic compound was also added to the dispersed phase. In Comparative Examples 1 to 8, a crosslinking agent was not added to the dispersed phase.

With the continuous phase in a state of continuous stirring with a magnetic stirrer under ice cooling, a 10 minute irradiation with an ultrasonic homogenizer (Ultrasonic Processor VC-750, manufactured by Sonics & Materials, Inc.) was conducted while the premixed dispersed phase was added dropwise to the continuous phase, thus obtaining an oil-in-oil (O/O) emulsion.

The solvent B within the dispersed phase was removed from the obtained emulsion under reduced pressure using an evaporator, thus obtaining a colored resin particle dispersion. The rate of removal of the solvent B was essentially 100 mass %. This colored resin particle dispersion was used as an ink with no further modification.

Formulations of inks of the examples and comparative examples following removal of the solvent B are shown in Table 5 to Table 7. The amount of the non-volatile fraction was determined from the combined total of the amount of each of the non-volatile components (the basic dispersant, the colorant, the crosslinking agent, the solid resin and the acidic compound) relative to the total mass of the ink, and this amount of the non-volatile fraction is also shown in each table.

In the crosslinking agents 4 to 6, the volatile fraction is mainly isopropanol, and therefore when the solvent B is removed, the volatile fraction within the crosslinking agent 4 to 6 is also removed. Accordingly, in Tables 5 and 6, the amounts of the crosslinking agents 4 to 6 following removal of the solvent B do not include a volatile fraction.

TABLE 2

Formulations of oil-in-oil emulsions of Examples (prior to solvent B removal)

| Units: mass % | | | Example | | | | | | |
|---|---|---|---|---|---|---|---|---|---|
| | | | 1 | 2 | 3 | 4 | 5 | 6 | 7 |
| Continuous phase | Solvent A | Isopar M | 54.0 | 54.0 | 66.0 | 54.0 | 54.0 | 54.0 | 54.0 |
| | Basic dispersant | S11200 (non-volatile fraction 50%) | 6.0 (3.0) | 6.0 (3.0) | 4.0 (2.0) | 6.0 (3.0) | 6.0 (3.0) | 6.0 (3.0) | 6.0 (3.0) |
| Dispersed phase | Solvent B | Methanol | 25.7 | 25.7 | 16.8 | 25.7 | 25.7 | 25.7 | 25.7 |
| | Colorant | Carbon black | 5.7 | 5.7 | 5.3 | 5.7 | | 5.7 | |
| | | Black metal complex dye | | | | | 5.7 | | 5.7 |

TABLE 2-continued

Formulations of oil-in-oil emulsions of Examples (prior to solvent B removal)

| Units: mass % | | | Example 1 | Example 2 | Example 3 | Example 4 | Example 5 | Example 6 | Example 7 |
|---|---|---|---|---|---|---|---|---|---|
| Cross-linking agent | | Crosslinking agent 1 carbodiimide-based (non-volatile fraction 100%) | 2.9 | | | | | | |
| | | Crosslinking agent 2 carbodiimide-based (non-volatile fraction 100%) | | 2.9 | | | | | 2.9 |
| | | Crosslinking agent 3 polyfunctional aziridine-based (non-volatile fraction 100%) | | | 2.6 | | | | |
| | | Crosslinking agent 4 titanium chelate-based (non-volatile fraction 65%) | | | | 2.9 (1.9) | | | |
| | | Crosslinking agent 5 titanium chelate-based (non-volatile fraction 80%) | | | | | 2.9 (2.3) | | |
| | | Crosslinking agent 6 oxazoline-based (non-volatile fraction 25%) | | | | | | 2.9 (0.7) | |
| Solid resin | | Acrylic resin 1 | 5.7 | | | | | | |
| | | Acrylic resin 2 | | 5.7 | | | | | |
| | | Acrylic resin 3 | | | 5.3 | | | | |
| | | Nitrocellulose | | | | 5.7 | | | |
| | | Polyvinyl alcohol | | | | | 5.7 | | |
| | | Polyamide resin | | | | | | 5.7 | |
| | | Styrene-maleic acid resin | | | | | | | 5.7 |
| | | Polyvinyl butyral resin | | | | | | | |
| Total (mass %) | | | 100.0 | 100.0 | 100.0 | 100.0 | 100.0 | 100.0 | 100.0 |

TABLE 3

Formulations of oil-in-oil emulsions of Examples (prior to solvent B removal)

| | | Units: mass % | Example 8 | Example 9 | Example 10 | Example 11 | Example 12 | Example 13 | Example 14 |
|---|---|---|---|---|---|---|---|---|---|
| Continuous phase | Solvent A | Isopar M | 54.0 | 54.0 | 54.0 | 66.0 | 54.0 | 54.0 | 54.0 |
| | Basic dispersant | S11200 (non-volatile fraction 50%) | 6.0 (3.0) | 6.0 (3.0) | 6.0 (3.0) | 4.0 (2.0) | 6.0 (3.0) | 6.0 (3.0) | 6.0 (3.0) |
| Dispersed phase | Solvent B | Methanol | 25.7 | 20.0 | 20.0 | 11.5 | 20.0 | 20.0 | 20.0 |
| | Colorant | Carbon black | 5.7 | 5.7 | 5.7 | 5.3 | 5.7 | | |
| | | Black metal complex dye | | | | | | 5.7 | 5.7 |
| | Cross-linking agent | Crosslinking agent 1 carbodiimide-based (non-volatile fraction 100%) | | 2.9 | | | | | |
| | | Crosslinking agent 2 carbodiimide-based (non-volatile fraction 100%) | | | 2.9 | | | | 2.9 |
| | | Crosslinking agent 3 polyfunctional aziridine-based (non-volatile fraction 100%) | | | | 2.6 | | | |
| | | Crosslinking agent 4 titanium chelate-based (non-volatile fraction 65%) | 2.9 (1.9) | | | | 2.9 (1.9) | | |
| | | Crosslinking agent 5 titanium chelate-based (non-volatile fraction 80%) | | | | | | 2.9 (2.3) | |
| | | Crosslinking agent 6 oxazoline-based (non-volatile fraction 25%) | | | | | | | |
| | Solid resin | Acrylic resin 1 | | 5.7 | | | | | |
| | | Acrylic resin 2 | | | 5.7 | | | | |
| | | Acrylic resin 3 | | | | 5.3 | | | |
| | | Nitrocellulose | | | | | 5.7 | | |
| | | Polyvinyl alcohol | | | | | | 5.7 | |

TABLE 3-continued

Formulations of oil-in-oil emulsions of Examples (prior to solvent B removal)

| Units: mass % | | | Example 8 | 9 | 10 | 11 | 12 | 13 | 14 |
|---|---|---|---|---|---|---|---|---|---|
| Acidic compound | Polyamide resin | | | | | | | | |
| | Styrene-maleic acid resin | | | | | | | | |
| | Polyvinyl butyral resin | | 5.7 | | | | | | |
| | BYK111 (non-volatile fraction 95%) | | | 5.7 (5.4) | 5.7 (5.4) | 5.3 (5.1) | 5.7 (5.4) | 5.7 (5.4) | 5.7 (5.4) |
| Total (mass %) | | | 100.0 | 100.0 | 100.0 | 100.0 | 100.0 | 100.0 | 100.0 |

TABLE 4

Formulations of oil-in-oil emulsions of Comparative Examples (prior to solvent B removal)

| | | | Comparative Example | | | | | | | |
|---|---|---|---|---|---|---|---|---|---|---|
| Units: mass % | | | 1 | 2 | 3 | 4 | 5 | 6 | 7 | 8 |
| Continuous phase | Solvent A | Isopar M | 54.0 | 54.0 | 66.0 | 54.0 | 54.0 | 54.0 | 54.0 | 54.0 |
| | Basic dispersant | S11200 (non-volatile fraction 50%) | 6.0 (3.0) | 6.0 (3.0) | 4.0 (2.0) | 6.0 (3.0) | 6.0 (3.0) | 6.0 (3.0) | 6.0 (3.0) | 6.0 (3.0) |
| Dispersed phase | Solvent B | Methanol | 28.0 | 28.0 | 18.6 | 28.0 | 28.0 | 28.0 | 28.0 | 28.0 |
| | Colorant | Carbon black | 6.0 | 6.0 | 5.6 | 6.0 | | 6.0 | | |
| | | Black metal complex dye | | | | | 6.0 | | 6.0 | 6.0 |
| | Solid resin | Acrylic resin 1 | 6.0 | | | | | | | |
| | | Acrylic resin 2 | | 6.0 | | | | | | |
| | | Acrylic resin 3 | | | 6.0 | | | | | |
| | | Nitrocellulose | | | | 6.0 | | | | |
| | | Polyvinyl alcohol | | | | | 6.0 | | | |
| | | Polyamide resin | | | | | | 6.0 | | |
| | | Styrene-maleic acid resin | | | | | | | 6.0 | |
| | | Polyvinyl butyral resin | | | | | | | | 6.0 |
| Total (mass %) | | | 100.0 | 100.0 | 100.0 | 100.0 | 100.0 | 100.0 | 100.0 | 100.00 |

TABLE 5

Ink formulations of Examples (after solvent B removal) and evaluation results

| | | | Example | | | | | | |
|---|---|---|---|---|---|---|---|---|---|
| Units: mass % | | | 1 | 2 | 3 | 4 | 5 | 6 | 7 |
| Continuous phase | Solvent A | Isopar M | 72.7 | 72.7 | 79.3 | 73.6 | 73.3 | 74.9 | 72.7 |
| | Basic dispersant | S11200 (non-volatile fraction 50%) | 8.1 (4.0) | 8.1 (4.0) | 4.8 (2.4) | 8.2 (4.1) | 8.2 (4.1) | 8.3 (4.1) | 8.1 (4.0) |
| Dispersed phase | Solvent B | Methanol | 0 | 0 | 0 | 0 | 0 | 0 | 0 |
| | Colorant | Carbon black | 7.7 | 7.7 | 6.4 | 7.8 | | 7.9 | |
| | | Black metal complex dye | | | | | 7.7 | | 7.7 |
| | Crosslinking agent | Crosslinking agent 1 carbodiimide-based | 3.9 | | | | | | |
| | | Crosslinking agent 2 carbodiimide-based | | 3.9 | | | | | 3.9 |
| | | Crosslinking agent 3 polyfunctional aziridine-based | | | 3.1 | | | | |
| | | Crosslinking agent 4 titanium chelate-based | | | | 2.6 | | | |
| | | Crosslinking agent 5 titanium chelate-based | | | | | 3.1 | | |
| | | Crosslinking agent 6 oxazoline-based | | | | | | 1.0 | |
| | Solid resin | Acrylic resin 1 | 7.7 | | | | | | |
| | | Acrylic resin 2 | | 7.7 | | | | | |
| | | Acrylic resin 3 | | | 6.4 | | | | |
| | | Nitrocellulose | | | | 7.8 | | | |
| | | Polyvinyl alcohol | | | | | 7.7 | | |

TABLE 5-continued

Ink formulations of Examples (after solvent B removal) and evaluation results

| Units: mass % | | Example | | | | | | |
|---|---|---|---|---|---|---|---|---|
| | | 1 | 2 | 3 | 4 | 5 | 6 | 7 |
| Polyamide resin | | | | | | | 7.9 | |
| Styrene-maleic acid resin | | | | | | | | 7.7 |
| Polyvinyl butyral resin | | | | | | | | |
| Total (mass %) | | 100.0 | 100.0 | 100.0 | 100.0 | 100.0 | 100.0 | 100.0 |
| Amount of non-volatile fraction (mass %) | | 23.3 | 23.3 | 18.3 | 22.3 | 22.5 | 21.0 | 23.3 |
| Evaluations | Particle size [nm] | 170 | 170 | 160 | 180 | 180 | 190 | 180 |
| | Rub fastness after short time | A | A | A | A | A | A | B |
| | Rub fastness after standing for 1 day | A | A | A | A | A | A | B |
| | Storage stability at 70° C. (precipitation) | A | A | A | A | A | A | A |
| | Water resistance after standing for 1 day | A | A | A | A | A | A | A |

TABLE 6

Ink formulations of Examples (after solvent B removal) and evaluation results

| | | | Example | | | | | | |
|---|---|---|---|---|---|---|---|---|---|
| Units: mass % | | | 8 | 9 | 10 | 11 | 12 | 13 | 14 |
| Continuous phase | Solvent A | Isopar M | 73.6 | 67.6 | 67.6 | 74.6 | 68.4 | 67.9 | 67.6 |
| | Basic dispersant | S11200 (non-volatile fraction 50%) | 8.2 (4.1) | 7.5 (3.7) | 7.5 (3.7) | 4.5 (2.3) | 7.6 (3.8) | 7.6 (3.8) | 7.5 (3.7) |
| Dispersed phase | Solvent B | Methanol | 0.0 | 0.0 | 0.0 | 0.0 | 0.0 | 0.0 | 0.0 |
| | Colorant | Carbon black | 7.8 | 7.1 | 7.1 | 6.0 | 7.2 | | |
| | | Black metal complex dye | | | | | | 7.2 | 7.1 |
| | Crosslinking agent | Crosslinking agent 1 carbodiimide-based | | 3.6 | | | | | |
| | | Crosslinking agent 2 carbodiimide-based | | | 3.6 | | | | 3.6 |
| | | Crosslinking agent 3 polyfunctional aziridine-based | | | | 2.9 | | | |
| | | Crosslinking agent 4 titanium chelate-based | 2.6 | | | | 2.4 | | |
| | | Crosslinking agent 5 titanium chelate-based | | | | | | 2.9 | |
| | | Crosslinking agent 6 oxazoline-based | | | | | | | |
| | Solid resin | Acrylic resin 1 | | 7.1 | | | | | |
| | | Acrylic resin 2 | | | 7.1 | | | | |
| | | Acrylic resin 3 | | | | 6.0 | | | |
| | | Nitrocellulose | | | | | 7.2 | | |
| | | Polyvinyl alcohol | | | | | | 7.2 | |
| | | Polyamide resin | | | | | | | |
| | | Styrene-maleic acid resin | | | | | | | 7.1 |
| | | Polyvinyl butyral resin | 7.8 | | | | | | |
| | Acidic compound | BYK111 (non-volatile fraction 95%) | | 7.1 (6.7) | 7.1 (6.7) | 6.0 (5.7) | 7.2 (6.8) | 7.2 (6.8) | 7.1 (6.7) |
| Total (mass %) | | | 100.0 | 100.0 | 100.0 | 100.0 | 100.0 | 100.0 | 100.0 |
| Amount of non-volatile fraction (mass %) | | | 22.3 | 28.2 | 28.2 | 22.9 | 27.4 | 27.9 | 28.2 |
| Evaluations | Particle size [nm] | | 170 | 170 | 170 | 160 | 180 | 180 | 180 |
| | Rub fastness after short time | | A | AA | AA | AA | AA | A | B |
| | Rub fastness after standing for 1 day | | A | AA | AA | AA | AA | AA | A |
| | Storage stability at 70° C. (precipitation) | | A | A | A | A | A | A | A |
| | Water resistance after standing for 1 day | | A | A | A | A | A | A | A |

TABLE 7

Ink formulations of Comparative Examples (after solvent B removal) and evaluation results

| | | | Comparative Example | | | | | | | |
|---|---|---|---|---|---|---|---|---|---|---|
| | Units: mass % | | 1 | 2 | 3 | 4 | 5 | 6 | 7 | 8 |
| Continuous phase | Solvent A | Isopar M | 75.0 | 75.0 | 81.2 | 75.0 | 75.0 | 75.0 | 75.0 | 75.0 |
| | Basic dispersant | S11200 (non-volatile fraction 50%) | 8.4 (4.2) | 8.4 (4.2) | 5.0 (2.5) | 8.4 (4.2) | 8.4 (4.2) | 8.4 (4.2) | 8.4 (4.2) | 8.4 (4.2) |
| Dispersed phase | Solvent B | Methanol | 0.0 | 0.0 | 0.0 | 0.0 | 0.0 | 0.0 | 0.0 | 0.0 |
| | Colorant | Carbon black | 8.3 | 8.3 | 6.9 | 8.3 | | 8.3 | | |
| | | Black metal complex dye | | | | | 8.3 | | 8.3 | 8.3 |
| | Solid resin | Acrylic resin 1 | 8.3 | | | | | | | |
| | | Acrylic resin 2 | | 8.3 | | | | | | |
| | | Acrylic resin 3 | | | 6.9 | | | | | |
| | | Nitrocellulose | | | | 8.3 | | | | |
| | | Polyvinyl alcohol | | | | | 8.3 | | | |
| | | Polyamide resin | | | | | | 8.3 | | |
| | | Styrene-maleic acid resin | | | | | | | 8.3 | |
| | | Polyvinyl butyral resin | | | | | | | | 8.3 |
| | Total (mass %) | | 100.0 | 100.0 | 100.0 | 100.0 | 100.0 | 100.0 | 100.0 | 100.0 |
| | Amount of non-volatile fraction (mass %) | | 20.8 | 20.8 | 16.3 | 20.8 | 20.8 | 20.8 | 20.8 | 20.8 |
| Evaluations | Particle size [nm] | | 250 | 300 | 230 | 250 | 230 | 230 | 230 | 230 |
| | Rub fastness after short time | | C | C | C | C | C | C | C | C |
| | Rub fastness after standing for 1 day | | C | C | C | C | C | C | C | C |
| | Storage stability at 70° C. (precipitation) | | C | C | C | C | C | C | C | C |
| | Water resistance after standing for 1 day | | A | A | A | A | A | A | A | A |

The components shown in each of the tables are described below.

(Continuous Phase)

Solvent A "Isopar M": an isoparaffin-based hydrocarbon-based solvent, manufactured by TonenGeneral Sekiyu K.K.

Basic dispersant "S 11200": Solsperse 11200 manufactured by Lubrizol Japan Ltd., non-volatile fraction 50%, base value 37 mgKOH/g.

(Dispersed Phase)

Solvent B "Methanol": an alcohol-based solvent having a carbon number of 1, manufactured by Wako Pure Chemical Industries, Ltd.

Carbon black: "MA-8" manufactured by Mitsubishi Chemical Corporation.

Black metal complex dye: "Valifast Black 3810" manufactured by Orient Chemical Industries Co., Ltd.

Acidic compound "BYK111": a liquid organic compound having two phosphate ester groups (a phosphate ester compound having phosphoric acid groups at both terminals of a copolymer), "DISPERBYK-111" manufactured by BYK-Chemie Japan K.K., acid value 129 mgKOH/g, non-volatile fraction 95.0%.

(Crosslinking Agent)

Crosslinking agent 1 "carbodiimide-based": a carbodiimide, "Carbodilite V-02B" manufactured by Nisshinbo Chemical Inc., non-volatile fraction 100%.

Crosslinking agent 2 "carbodiimide-based": a carbodiimide, "Carbodilite V-04K" manufactured by Nisshinbo Chemical Inc., non-volatile fraction 100%.

Crosslinking agent 3 "polyfunctional aziridine-based": a polyfunctional aziridine, "Chemitite PZ-33" manufactured by Nippon Shokubai Co., Ltd., non-volatile fraction 100%.

Crosslinking agent 4 "titanium chelate-based": a titanium chelate, "Orgatix TC-401" manufactured by Matsumoto Fine Chemical Co., Ltd., non-volatile fraction 65%.

Crosslinking agent 5 "titanium chelate-based": a titanium chelate, "Orgatix TC-400" manufactured by Matsumoto Fine Chemical Co., Ltd., non-volatile fraction 80%.

Crosslinking agent 6 "oxazoline-based": an oxazoline, "Epocros WS-700" manufactured by Nippon Shokubai Co., Ltd., non-volatile fraction 25%.

(Solid Resin)

Acrylic resin 1: (Mw) 10,000, (acid value) 74 mgKOH/g, "UC3000" manufactured by Toagosei Co., Ltd.

Acrylic resin 2: (Mw) 16,000, (acid value) 242 mgKOH/g, "UC3920" manufactured by Toagosei Co., Ltd.

Acrylic resin 3: (Mw) 7,500, (acid value) 258 mgKOH/g, "UC5041" manufactured by Toagosei Co., Ltd.

Nitrocellulose: degree of nitration 10.7 to 11.2, "DLX5-8" manufactured by Nobel NC Co., Ltd.

Polyvinyl alcohol: degree of saponification 37.3 mol %, (Mw) 17,500, acetate groups 62.7 mol %, "JMR-10L" manufactured by Japan VAM & Poval Co., Ltd.

Polyamide resin: (Mw) 17,000, "FR-301" manufactured by Namariichi Co., Ltd.

Styrene-maleic acid resin: (Mw) 7,000, "SMA Resin 1440F" manufactured by Kawahara Petrochemical Co., Ltd.

Polyvinyl butyral resin: (Mw) 15,000, "BL-10" manufactured by Sekisui Chemical Co., Ltd.

The above Mw values indicate the weight-average molecular weight.

The solubility of the methanol of the solvent B in the hydrocarbon-based solvent (Isopar M) of the solvent A at 23° C. is 0.4 g/100 g. Further the boiling point of methanol is 64.7° C., and the 50% distillation point of Isopar M is 234° C.

The Solsperse 11200 used as the basic dispersant was dissolved in the solvent A in accordance with the continuous phase blend proportions shown in Table 2 to Table 4, whereas the solubility in the solvent B at 23° C. was less than 3 g/100 g.

The solid resins were dissolved in the solvent B in accordance with the dispersed phase blend proportions shown in Table 2 to Table 4, whereas the solubility in the solvent A at 23° C. was less than 3 g/100 g, and the solubility in water at 23° C. was less than 3 g/100 g.

The crosslinking agents were dissolved in the solvent B in accordance with the dispersed phase blend proportions shown in Table 2 and Table 3, whereas the solubility in the solvent A at 23° C. was less than 3 g/100 g.

The acidic compound was dissolved in the solvent B in accordance with the dispersed phase blend proportions shown in Table 3, whereas the solubility in the solvent A at 23° C. was less than 3 g/100 g.

The solubility parameter (HSP value) of each component is detailed below. The units are MPa/cm³. Further, the dispersion parameter δd, the polar parameter δp, and the hydrogen bonding parameter δh are also shown below.

Solvent A "Isopar M": 16 (δd=16, δp=0, δh=0).
Solvent B "Methanol": 29.6 (δd=15.1, δp=12.3, δh=223).
The various solid resins: were within a range from 22 to 27 (δd=12 to 20, δp=5 to 12, δh=10 to 20).
The acidic compound: is within a range from 22 to 27 (δd=12 to 20, δp=5 to 12, δ=10 to 20).

The oxidation-reduction potential (ORP value) of each component is listed below. The units are mV.

Solsperse 11200: the ORP value when dissolved in dodecane at 5.0 mass % was lower than the ORP value when dissolved at 0.5 mass %, and the ORP value when dissolved in dodecane at 5.0 mass % was –85.

DISPERBYK-111: the ORP value when dissolved in methanol at 5.0 mass % was higher than the ORP value when dissolved at 0.5 mass %, and the ORP value when dissolved in methanol at 5.0 mass % was 350.

<Evaluations>

Using each of the inks described above, each of the following evaluations was performed. The results are shown in Table 4 and Table 5.

(Rub Fastness after Short Time and after Standing for 1 Day)

Each of the inks described above was mounted in a line-type inkjet printer "Orphis-X9050" (manufactured by Riso Kagaku Corporation), and a printed item was obtained by printing a solid image onto a high-quality coated paper "Aurora Coated Paper" (manufactured by Nippon Paper Industries Co., Ltd.). The printing was performed at a resolution of 300×300 dpi, under discharge conditions including an ink volume per dot of 42 pl. The "Orphis X9050" is a system that uses a line-type inkjet head, wherein the paper is transported in a sub-scanning direction perpendicular to the main scanning direction (the direction along which the nozzles are aligned) while printing is conducted.

Following standing for 300 seconds (short time) or 24 hours (1 day) after printing, the solid image portion of the printed item was rubbed 5 times strongly with a finger. The state of the printed item was then inspected visually, and the rub fastness was evaluated against the following criteria.

AA: no separation of the image occurred.
A: almost no separation of the image could be detected.
B: minor separation of the image was confirmed, but not problematic in actual use.
C: marked separation of the image occurred, at a level problematic for actual use.

(Storage Stability at 70° C.)

Each of the inks described above was placed in a glass bottle, and the bottle was sealed and stored at 70° C. After storage for 2 weeks, the ink was inspected for the presence or absence of precipitation, and the storage stability at 70° C. was evaluated against the following criteria.

A: no precipitation.
B: a small amount of fluid precipitate.
C: non-fluid precipitate.

(Water Resistance after Standing for 1 Day)

A printed item was obtained in the same manner as that described above for the rub fastness evaluation. Following standing for 24 hours (1 day) after printing, 0.5 ml of water was dripped onto the solid image portion of the printed item, the level of bleeding was observed visually, and the water resistance was evaluated against the following criteria.

A: no bleeding of the printed image portion.
B: minor bleeding of the printed image portion, but not problematic in actual use.
C: bleeding of the printed image portion, at a level problematic for actual use.

(Average Particle Size of Colored Resin Particles)

For each of the inks described above, the volume-based average particle size of the colored resin particles dispersed in the ink was measured using a dynamic light scattering particle size distribution analyzer "LB-500" (manufactured by Horiba, Ltd.).

As is evident from the tables shown above, the ink of each example contained a solid resin that had been crosslinked using a crosslinking agent, and the ink exhibited favorable results for all the evaluations, and furthermore, the average particle size of the colored resin particles also fell within an appropriate range.

In Examples 1 to 8, each of the various solid resins and each of the various crosslinking agents were combined to prepare the inks, and favorable results were obtained in each case.

In Examples 1 to 6 and Example 8, an acrylic resin, nitrocellulose, polyamide resin or polyvinyl butyral resin was used as the solid resin respectively, and the rub fastness was able to be more improved. It is thought that because these resins have more crosslinking points than the styrene-maleic acid resin of Example 7, a more favorable effect was able to be obtained.

In Examples 9 to 14, each of the various solid resins and each of the various crosslinking agents were combined, and an acidic compound was also added, and the rub fastness was able to be improved even further.

In each of the comparative examples, the solid resin was not crosslinked, and satisfactory results could not be obtained.

It is to be noted that, besides those already mentioned above, many modifications and variations of the above embodiments may be made without departing from the novel and advantageous features of the present invention. Accordingly, all such modifications and variations are intended to be included within the scope of the appended claims.

The invention claimed is:

1. A colored resin particle dispersion comprising colored resin particles, a basic dispersant, and a non-aqueous solvent,
   wherein the colored resin particles comprise a colorant and a crosslinked solid resin,
   the crosslinked solid resin is a resin obtained by crosslinking a reactive solid resin using a crosslinking agent, and
   the reactive solid resin comprises at least one selected from the group consisting of a nitrocellulose, a polyamide resin having an alkoxy group, a polyvinyl acetal resin, and a polyvinyl alcohol.

2. The colored resin particle dispersion according to claim 1, wherein the reactive solid resin comprises at least one of a carboxyl group, a hydroxyl group and an amide linkage.

3. The colored resin particle dispersion according to claim 2, wherein the reactive solid resin comprises the carboxyl group.

4. The colored resin particle dispersion according to claim 2, wherein the reactive solid resin comprises the hydroxyl group.

5. The colored resin particle dispersion according to claim 2, wherein the reactive solid resin comprises the amide linkage.

6. The colored resin particle dispersion according to claim 1, wherein the reactive solid resin comprises the nitrocellulose.

7. The colored resin particle dispersion according to claim 1, wherein the reactive solid resin comprises the polyamide resin having an alkoxy group.

8. The colored resin particle dispersion according to claim 1, wherein the reactive solid resin comprises the polyvinyl acetal resin.

9. The colored resin particle dispersion according to claim 1, wherein the reactive solid resin comprises the polyvinyl alcohol.

10. The colored resin particle dispersion according to claim 1, wherein the colored resin particles further comprise a liquid organic compound having an acidic group.

11. The colored resin particle dispersion according to claim 10, wherein the acidic group of the liquid organic compound having an acidic group comprises a phosphoric acid group.

12. The colored resin particle dispersion according to claim 1, wherein the colored resin particle dispersion is an inkjet ink.

13. A colored resin particle dispersion comprising colored resin particles, a basic dispersant, and a non-aqueous solvent, wherein the colored resin particles comprise a colorant, a crosslinked solid resin, and a liquid organic compound having an acidic group, and
the acidic group of the liquid organic compound having an acidic group comprises a phosphoric acid group.

14. The colored resin particle dispersion according to claim 1,
wherein the reactive solid resin is a solid resin having hydroxyl groups, and
the crosslinking agent is at least one of metal chelate-based compounds, and isocyanate-based compounds.

15. The colored resin particle dispersion according to claim 1, wherein the crosslinking agent comprises at least one of carbodiimide-based compounds, aziridine-based compounds, metal chelate-based compounds, isocyanate-based compounds, epoxy-based compounds, oxazoline-based compounds, urea-based compounds, polyamine-based compounds, polyethyleneimine-based compounds, and acrylamide-based compounds.

* * * * *